United States Patent
Houston et al.

(10) Patent No.: US 12,495,015 B2
(45) Date of Patent: Dec. 9, 2025

(54) COMMUNICATION WITH USERS FOR AUTONOMOUS DELIVERY

(71) Applicant: GM Cruise Holdings LLC, San Francisco, CA (US)

(72) Inventors: Jonah Houston, San Jose, CA (US); Lauren Argo, Brooklyn, NY (US)

(73) Assignee: GM Cruise Holdings LLC, San Francisco, CA (US)

( * ) Notice: Subject to any disclaimer, the term of this patent is extended or adjusted under 35 U.S.C. 154(b) by 195 days.

(21) Appl. No.: 18/327,406

(22) Filed: Jun. 1, 2023

(65) Prior Publication Data
US 2024/0406131 A1    Dec. 5, 2024

(51) Int. Cl.
*H04L 51/222*    (2022.01)
*G01C 21/34*    (2006.01)
*G01C 21/36*    (2006.01)
*B60W 60/00*    (2020.01)

(52) U.S. Cl.
CPC ........ *H04L 51/222* (2022.05); *G01C 21/3415* (2013.01); *G01C 21/3617* (2013.01); *B60W 60/00256* (2020.02)

(58) Field of Classification Search
None
See application file for complete search history.

(56) References Cited

U.S. PATENT DOCUMENTS

| | | | |
|---|---|---|---|
| 9,916,557 B1* | 3/2018 | Gillen | G06Q 50/00 |
| 2017/0061373 A1* | 3/2017 | Hara | G06Q 10/0836 |
| 2018/0003519 A1* | 1/2018 | Park | G01C 21/3617 |
| 2019/0043001 A1* | 2/2019 | Woulfe | G01C 21/3438 |
| 2021/0065111 A1* | 3/2021 | Smith | G06Q 10/08355 |
| 2021/0201265 A1* | 7/2021 | Galliano, III | G01C 21/3697 |
| 2022/0044198 A1* | 2/2022 | Meister | G06Q 10/0833 |
| 2022/0284491 A1* | 9/2022 | Qu | G06Q 30/0603 |
| 2022/0366369 A1* | 11/2022 | Nice | G08G 1/202 |
| 2024/0039882 A1* | 2/2024 | Varma | H04L 51/48 |
| 2024/0330846 A1* | 10/2024 | Rao Karikurve | G06Q 10/087 |

* cited by examiner

*Primary Examiner* — Anne Marie Antonucci
*Assistant Examiner* — Kyle S Park
(74) *Attorney, Agent, or Firm* — Honigman LLP; Matthew H. Szalach; Jonathan P. O'Brien

(57) ABSTRACT

One or more messages may be sent to a user who is to receive an item delivered by an AV. A message may include information of an attribute of the item that triggers the generation of the one or more messages. The attribute may indicate an extent of ease of the user carrying the item from a predetermined location, e.g., the drop-off location for the delivery. The attribute may be size, weight, temperature requirement, packaging, shape, etc. The item may be classified into a category requiring communication based on the attribute of the item and information of the user. A message may include a recommendation for using a tool or seeking help for carrying the item. A message may include an option to modify a setting (e.g., drop-off location) of the delivery. The classification of the item or generation of a message may be done by a machine learning model.

20 Claims, 7 Drawing Sheets

> Good news! An item that you have ordered is being delivered to the gate of your community as you requested. The estimated delivery time is 2 pm today.
>
> We have noticed that this item could be too heavy for you to carry by hand. We recommend you picking it up with a cart or come with another person who can help you.
>
> We can change the drop-off location to a different one that is convenient for you. If you would like to change the drop-off location, please press the "drop-off location" button below. You can also view a photo of the item by pressing the "photo" button.
>
> [DROP-OFF LOCATION]  [PHOTO]

610

> Did the previous message help?
>
>     

COMMUNICATION WITH USERS FOR AUTONOMOUS DELIVERY

TECHNICAL FIELD OF THE DISCLOSURE

The present disclosure relates generally to autonomous vehicles (AVs) and, more specifically, to communication with users for autonomous delivery done by AVs.

BACKGROUND

An AV is a vehicle that is capable of sensing and navigating its environment with little or no user input. An AV may sense its environment using sensing devices such as Radio Detection and Ranging (RADAR), Light Detection and Ranging (LIDAR), image sensors, cameras, and the like. An AV system may also use information from a global positioning system (GPS), navigation systems, vehicle-to-vehicle communication, vehicle-to-infrastructure technology, and/or drive-by-wire systems to navigate the vehicle. As used herein, the phrase "AV" includes both fully autonomous and semi-autonomous vehicles.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIG. 6 illustrates messages sent to a user for delivery of an item to the user, according to some embodiments of the present disclosure.

DESCRIPTION OF EXAMPLE EMBODIMENTS OF THE DISCLOSURE

Overview

Figure 1:
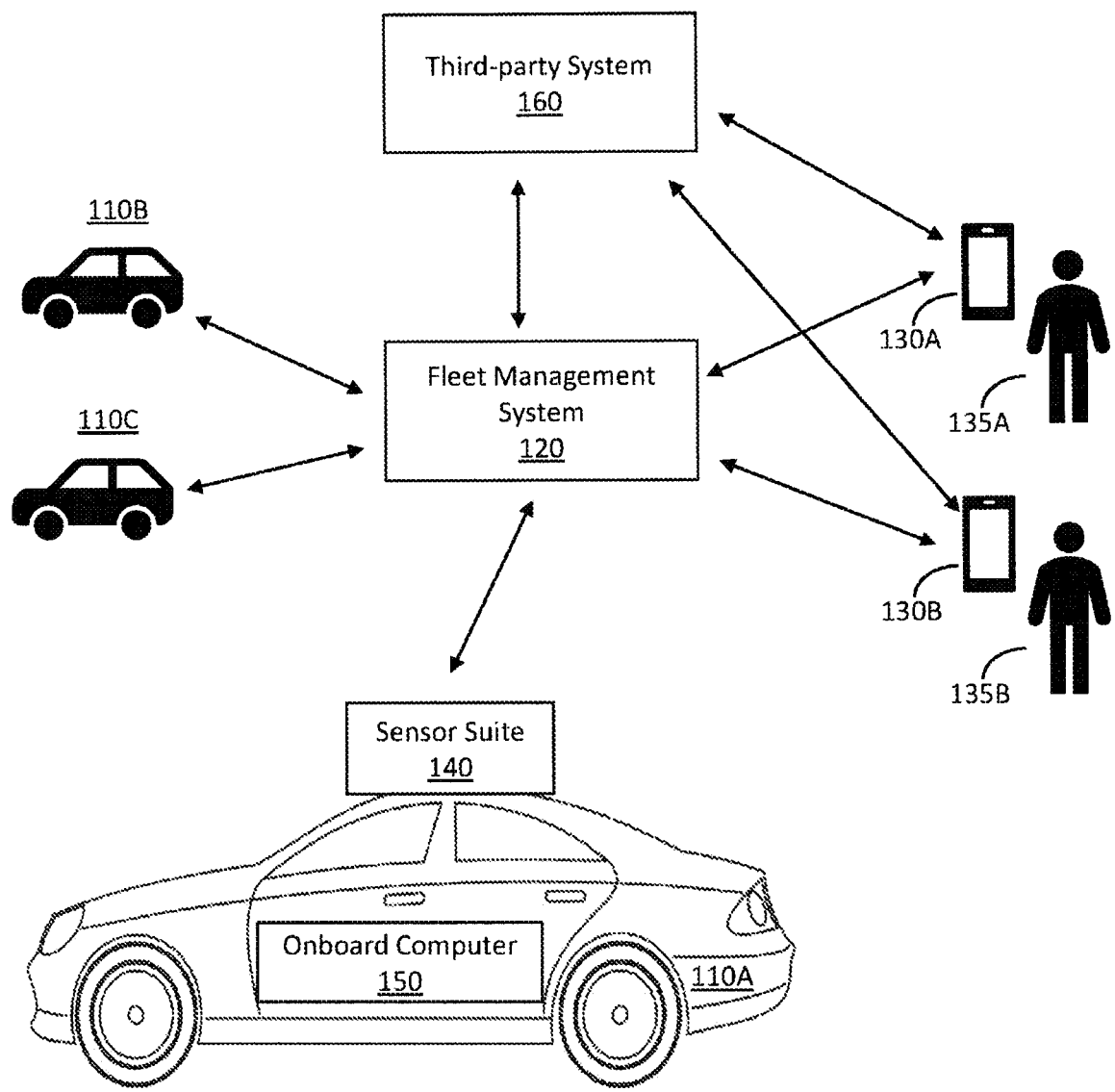
FIG. 1 illustrates a system including a fleet of AVs that can provide autonomous delivery services to users, according to some embodiments of the present disclosure.

The systems, methods and devices of this disclosure each have several innovative aspects, no single one of which is solely responsible for all of the desirable attributes disclosed herein. Details of one or more implementations of the subject matter described in this Specification are set forth in the description below and the accompanying drawings.

AVs can provide driverless services, such as delivery services, ride services, and so on. An individual or entity can request an AV to deliver an item to a person. The AV may pick up the item from one location and drop off the item to another location. With the autonomous driving features of the AV, the AV can navigate from the pick-up location to the drop-off location with no or little user input, and the person does not have to drive or be a passenger of the AV for the delivery. The person often needs to carry the item from the drop-off location to a target location (such as the person's home, office, etc.). However, the person may not have sufficient information about the item to be prepared for carrying the item. For certain items (such as items that are large, heavy, or need special handling), it can become a challenge.

Embodiments of the present disclosure provide a communication platform that facilitates communications with users for autonomous delivery done by AVs. In various embodiments of the present disclosure, requests for autonomous delivery may be received by a fleet management system that manages operations of AVs. A request for autonomous delivery is a request for delivering one or more items to a user. The fleet management system may instruct an AV to deliver the item. The request may be from the user or a third-party, such as a vendor providing the one or more items. The user may be a user of the fleet management system, a user of the third-party system that is maintained by the third-party and associated with the fleet management system, and so on.

After a request for delivery of an item to a user is received, the communication platform, which may be facilitated by the fleet management system or the AV, may collect information about an item. In some embodiments, the information about the item may be received from the third-party system, e.g., through an application programming interface (API) of the third-party system, or one or more other sources. The communication platform may determine an attribute (e.g., size, weight, temperature requirement, packaging, shape, etc.) of the item based on the information for the item. The attribute may indicate the extent of ease of the user carrying the item from the drop-off location. The communication platform may further determine whether to communicate with the user based on the attribute of the item. The communication platform may make personalized determinations based on information of the user, such as information that indicates a preference or tolerance of the user for picking up and carrying items.

After determining to communicate with the user, the communication platform may generate one or more messages to the user. A message may describe the attribute of the item that triggered the communication. The message may also include one or more recommendations with respect to how to carry the item from the drop-off location to the target location, such as recommendations for using tools, getting other people to help, and so on. A message may include one or more options for the user to modify the delivery service. For instance, a message may allow the user to modify the delivery item, the drop-off location, or other settings of the delivery service in light of the attribute of the item. In some embodiments, the communication platform may use a model trained with machine learning techniques to determine whether to communicate with users or generate messages. The communication platform may seek feedback from users on the communications and can further train the model based on user feedback.

As will be appreciated by one skilled in the art, aspects of the present disclosure, in particular aspects of AV sensor calibration, described herein, may be embodied in various manners (e.g., as a method, a system, a computer program product, or a computer-readable storage medium). Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "circuit," "module" or "system." Functions described in this disclosure may be implemented as an algorithm executed by one or more hardware processing units, e.g., one or more microprocessors, of one or more computers. In various embodiments, different steps and portions of the steps of each of the methods described herein may be performed by different processing units. Furthermore, aspects of the present disclosure may take the form of a computer program product embodied in one or more computer-readable medium(s), preferably non-transitory, having computer-readable program code embodied, e.g., stored, thereon. In various embodiments, such a computer program may, for example, be downloaded (updated) to the existing devices and systems (e.g., to the existing perception system devices or their controllers, etc.) or be stored upon manufacturing of these devices and systems.

The following detailed description presents various descriptions of specific certain embodiments. However, the innovations described herein can be embodied in a multitude of different ways, for example, as defined and covered by the claims or select examples. In the following description, reference is made to the drawings where like reference numerals can indicate identical or functionally similar elements. It will be understood that elements illustrated in the drawings are not necessarily drawn to scale. Moreover, it will be understood that certain embodiments can include more elements than illustrated in a drawing or a subset of the elements illustrated in a drawing. Further, some embodiments can incorporate any suitable combination of features from two or more drawings.

The following disclosure describes various illustrative embodiments and examples for implementing the features and functionality of the present disclosure. While particular components, arrangements, or features are described below in connection with various example embodiments, these are merely examples used to simplify the present disclosure and are not intended to be limiting.

In the Specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as "above", "below", "upper", "lower", "top", "bottom", or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction.

When used to describe a range of dimensions or other characteristics (e.g., time, pressure, temperature, length, width, etc.) of an element, operations, or conditions, the phrase "between X and Y" represents a range that includes X and Y.

In addition, the terms "comprise," "comprising," "include," "including," "have," "having" or any other variation thereof, are intended to cover a non-exclusive inclusion. For example, a method, process, device, or system that comprises a list of elements is not necessarily limited to only those elements but may include other elements not expressly listed or inherent to such method, process, device, or system. Also, the term "or" refers to an inclusive or and not to an exclusive or.

As described herein, one aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

Other features and advantages of the disclosure will be apparent from the following description and the claims.

The systems, methods and devices of this disclosure each have several innovative aspects, no single one of which is solely responsible for all of the desirable attributes disclosed herein. Details of one or more implementations of the subject matter described in this Specification are set forth in the description below and the accompanying drawings.

Example System with AV Fleet

FIG. 1 illustrates a system 100 including a fleet of AVs that can provide autonomous delivery services to users, according to some embodiments of the present disclosure. Autonomous delivery service is also referred to as "delivery service." The system 100 includes AVs 110A-110C (collectively referred to as "AVs 110" or "AV 110"), a fleet management system 120, client devices 130A and 130B (collectively referred to as "client devices 130" or "client device 130"), and a third-party system 160. The client devices 130A and 130B are associated with users 135A and 135B, respectively. The AV 110A includes a sensor suite 140 and an onboard computer 150. Even though not shown in FIG. 1, the AV 110B or 110C can also include a sensor suite 140 and an onboard computer 150. In other embodiments, the system 100 may include more, fewer, or different components. For example, the fleet of AVs 110 may include a different number of AVs 110 or a different number of client devices 130.

The fleet management system 120 manages the fleet of AVs 110. The fleet management system 120 may manage one or more services that the fleet of AVs 110 provides to the users 135. An example service is a delivery service, e.g., an AV 110 delivers one or more items from or to the user 135. The fleet management system 120 may facilitate a communication platform that can communicate with users for items delivered to the users by the AVs 110. Another example service is a ride service, e.g., an AV 110 provides a ride to a user 135 from a first location to a second location. The fleet management system 120 can select one or more AVs 110 (e.g., AV 110A) to perform a particular service, and instructs the selected AV to drive to one or more locations associated with the service (e.g., a first address to pick up user 135A, and a second address to pick up user 135B). The fleet management system 120 also manages fleet maintenance tasks, such as fueling, inspecting, and servicing of the AVs. As shown in FIG. 1, the AVs 110 communicate with the fleet management system 120. The AVs 110 and fleet management system 120 may connect over a network, such as the Internet.

In some embodiments, the fleet management system 120 receives service requests for the AVs 110 from the client devices 130. In an example, the user 135A accesses an app executing on the client device 130A and requests a ride from a pickup location (e.g., the current location of the client device 130A) to a destination location. The client device 130A transmits the ride request to the fleet management system 120. The fleet management system 120 selects an AV 110 from the fleet of AVs 110 and dispatches the selected AV 110A to the pickup location to carry out the ride request. In some embodiments, the ride request further includes a number of passengers in the group. In some embodiments, the ride request indicates whether a user 135 is interested in a shared ride with another user traveling in the same direction or along a same portion of a route. The ride request, or settings previously entered by the user 135, may further indicate whether the user 135 is interested in interaction with another passenger.

The fleet management system 120 may provide the AVs 110 information for navigating the AVs 110 during the operations of the AVs. For instance, the fleet management system 120 may provide maps (e.g., semantic maps, vector maps, etc.) of environments where AVs operate. The fleet management system 120 may also provide control models that can be used for controlling AV operations. The fleet management system 120 may train such control models using machine learning techniques. Certain aspects of the fleet management system 120 are described further in relation to FIG. 2.

A client device 130 is a device capable of communicating with the fleet management system 120, e.g., via one or more networks. The client device 130 can transmit data to the fleet management system 120 and receive data from the fleet management system 120. The client device 130 can also receive user input and provide output. In some embodiments, outputs of the client devices 130 are in human-perceptible forms, such as text, graphics, audio, video, and so on. The client device 130 may include various output components, such as monitors, speakers, headphones, projectors, and so on. The client device 130 may be a desktop or a laptop computer, a smartphone, a mobile telephone, a personal digital assistant (PDA), or another suitable device.

In some embodiments, a client device 130 executes an application allowing a user 135 of the client device 130 to interact with the fleet management system 120. For example, a client device 130 executes a browser application to enable interaction between the client device 130 and the fleet management system 120 via a network. In another embodiment, a client device 130 interacts with the fleet management system 120 through an application programming interface (API) running on a native operating system of the client device 130, such as IOS® or ANDROID™. The application may be provided and maintained by the fleet management system 120. The fleet management system 120 may also update the application and provide the update to the client device 130.

In some embodiments, a user 135 may submit service requests to the fleet management system 120 through a client device 130. A client device 130 may provide its user 135 a user interface (UI), through which the user 135 can make service requests, such as ride request (e.g., a request to pick up a person from a pickup location and drop off the person at a destination location), delivery request (e.g., a request to delivery one or more items from a location to another location), and so on. The UI may allow users 135 to provide locations (e.g., pickup location, destination location, etc.) or other information that would be needed by AVs 110 to provide services requested by the users 135.

The client device 130 may provide the user 135 an UI through which the user 135 can interact with the AV 110 that provides a ride to the user 135 or delivers an item to the user 135. The AV 110 may transmit one or more messages to the UI. The messages may be associated with one or more behaviors performed by the AV 110 for providing the ride to the user 135. The user 135 may view the messages in the UI. The UI may also allow the user 135 to interact with the messages. In some embodiments, the UI allows the user 135 to provide a comment or rate on the AV behaviors or the ride. The UI may also allow the user 135 to modify one or more settings of the ride in light of the AV behaviors.

The client device 130 may also facilitate communication of the user 135 with the fleet management system 120. For example, the client device 130 may receive one or more messages from the fleet management system 120 through a network or a telephone service (e.g., a customer service hotline). The messages may be associated with delivery of an item to the user by an AV 110. The client device 130 may allow the user 135 to interact with the one or more messages, e.g., by providing feedback to the one or more messages or selecting one or more options included in the one or more messages. The client device 130 may provide an UI that facilitates the communication. The client device 130 may also provide an UI that enables the user to submit a request for assistance to the fleet management system 120 through a network or a telephone service (e.g., a customer service hotline).

The AV 110 is preferably a fully autonomous automobile, but may additionally or alternatively be any semi-autonomous or fully autonomous vehicle, e.g., a boat, an unmanned aerial vehicle, a driverless car, etc. Additionally, or alternatively, the AV 110 may be a vehicle that switches between a semi-autonomous state and a fully autonomous state and thus, the AV may have attributes of both a semi-autonomous vehicle and a fully autonomous vehicle depending on the state of the vehicle. In some embodiments, some or all of the vehicle fleet managed by the fleet management system 120 are non-autonomous vehicles dispatched by the fleet management system 120, and the vehicles are driven by human drivers according to instructions provided by the fleet management system 120.

The AV 110 may include a throttle interface that controls an engine throttle, motor speed (e.g., rotational speed of electric motor), or any other movement-enabling mechanism; a brake interface that controls brakes of the AV (or any other movement-retarding mechanism); and a steering interface that controls steering of the AV (e.g., by changing the angle of wheels of the AV). The AV 110 may additionally or alternatively include interfaces for control of any other vehicle functions, e.g., windshield wipers, headlights, turn indicators, air conditioning, etc.

The sensor suite 140 may include a computer vision ("CV") system, localization sensors, and driving sensors. For example, the sensor suite 140 may include interior and exterior cameras, RADAR sensors, sonar sensors, LIDAR sensors, thermal sensors, wheel speed sensors, inertial measurement units (IMUs), accelerometers, microphones, strain gauges, pressure monitors, barometers, thermometers, altimeters, ambient light sensors, etc. The sensors may be located in various positions in and around the AV 110. For example, the AV 110 may have multiple cameras located at different positions around the exterior and/or interior of the AV 110. Certain sensors of the sensor suite 140 are described further in relation to FIG. 4.

The onboard computer 150 is connected to the sensor suite 140 and functions to control the AV 110 and to process sensed data from the sensor suite 140 and/or other sensors to determine the state of the AV 110. Based upon the vehicle state and programmed instructions, the onboard computer 150 modifies or controls the behavior of the AV 110. The onboard computer 150 may be preferably a general-purpose computer adapted for I/O communication with vehicle control systems and sensor suite 140 but may additionally or alternatively be any suitable computing device. The onboard computer 150 is preferably connected to the Internet via a wireless connection (e.g., via a cellular data connection).

Additionally or alternatively, the onboard computer 150 may be coupled to any number of wireless or wired communication systems.

In some embodiments, the onboard computer 150 is in communication with the fleet management system 120, e.g., through a network. The onboard computer 150 may receive instructions from the fleet management system 120 and control behavior of the AV 110 based on the instructions. For example, the onboard computer 150 may receive from the fleet management system 120 an instruction for providing a ride to a user 135. The instruction may include information of the ride (e.g., pickup location, drop-off location, intermediate stops, etc.), information of the user 135 (e.g., identifying information of the user 135, contact information of the user 135, etc.). The onboard computer 150 may determine a navigation route of the AV 110 based on the instruction. As another example, the onboard computer 150 may receive from the fleet management system 120 a request for sensor data to be used by the ride evaluation platform. The onboard computer 150 may control one or more sensors of the sensor suite 140 to detect the user 135, the AV 110, or an environment surrounding the AV 110 based on the instruction and further provide the sensor data from the sensor suite 140 to the fleet management system 120. The onboard computer 150 may transmit other information requested by the fleet management system 120, such as perception of the AV 110 that is determined by a perception module of the onboard computer 150, historical data of the AV 110, and so on.

The onboard computer 150 may receive one or more control models from the fleet management system 120. The onboard computer 150 may deploy the control models for controlling the AV 110. In some embodiments, an inference of a control model may be run by the onboard computer 150. The onboard computer 150 may further train the control model or fine tune the control model before the inference is conducted. In other embodiments, an inference of a control model may be run by the fleet management system 120, and the onboard computer 150 receives output of the control model from the fleet management system 120. Certain aspects of the onboard computer 150 are described further in relation to FIG. 5.

The third-party system 160 is associated with a third-party, such as a party that provides items to be delivered to the users 135. The third-party system 160 is in communication with the fleet management system 120 and the client devices 130, e.g., through a network. The third-party system 160 may provide an application for execution by a client device 130 or provide information of items for presentation via a client device 130. In some embodiments, the third-party system 160 may receive a request for one or more items from a client device 130. The third-party system 160 may send a request for autonomous delivery of the one or more items to the fleet management system 120 so that the fleet management system 120 can dispatch an AV 110 to deliver the one or more items to the user 135 associated with the client device 130. The third-party system 160 may provide information of an item to the fleet management system 120, e.g., as part of the request for autonomous delivery or in response to a request for information from the fleet management system 120. The third-party system 160 may also provide information of a user 135 to the fleet management system 120. In some embodiments, the third-party system 160 may maintain a user profile of a user 135.

Example Fleet Management System

Figure 2:
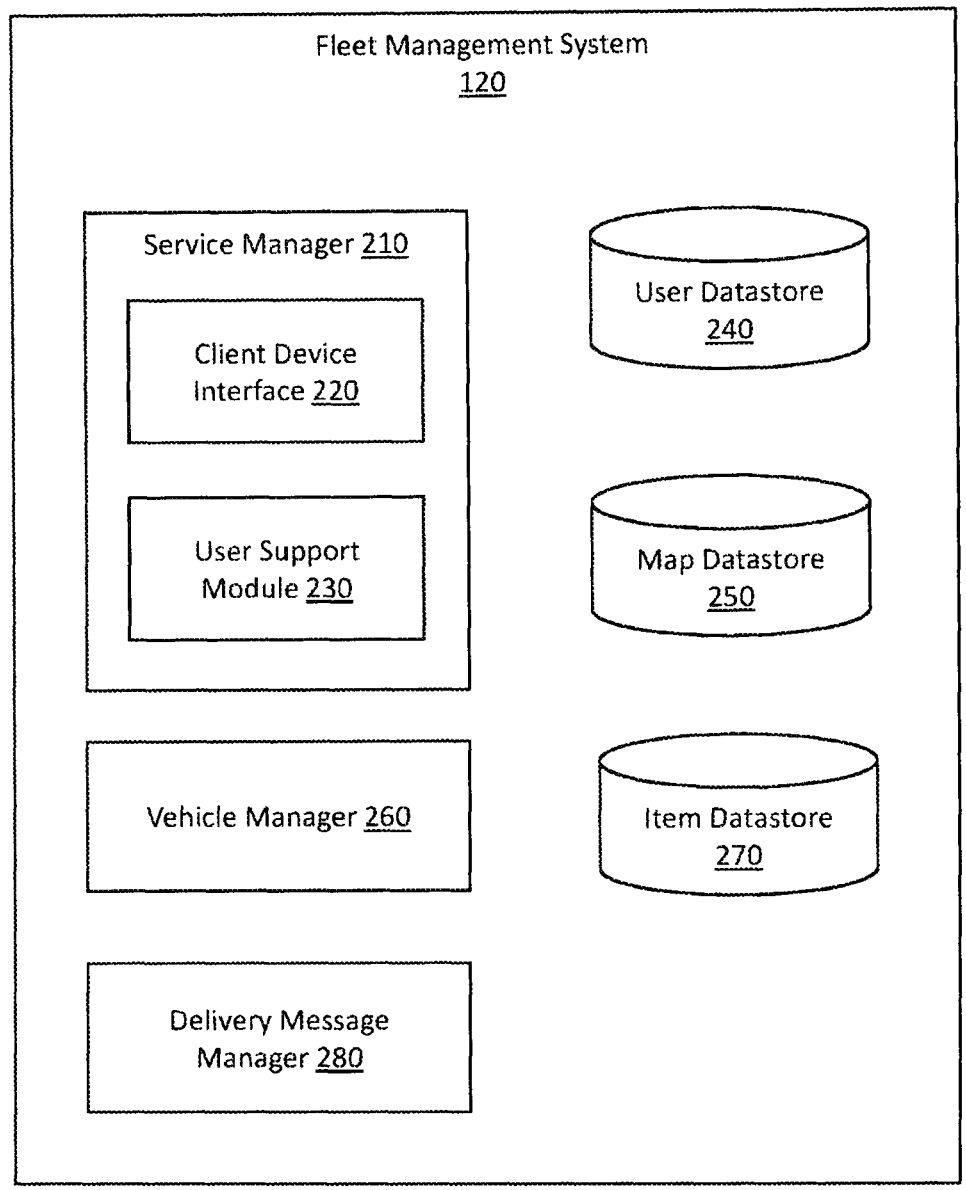
FIG. 2 is a block diagram showing a fleet management system, according to some embodiments of the present disclosure.

FIG. 2 is a block diagram showing the fleet management system, according to some embodiments of the present disclosure. The fleet management system 120 includes a service manager 210, a user datastore 240, a map datastore 250, a vehicle manager 260, and a delivery message manager 280. In alternative configurations, different and/or additional components may be included in the fleet management system 120. Further, functionality attributed to one component of the fleet management system 120 may be accomplished by a different component included in the fleet management system 120 or a different system than those illustrated, such as the onboard computer 150. For instance, some or all of the functionality attributed to the delivery message manager 280 may be accomplished by the onboard computer 150.

The service manager 210 manages services that the fleet of AVs 110 can provide. The service manager 210 includes a client device interface 220 and a user support module 230. The client device interface 220 provides interfaces to client devices, such as headsets, smartphones, tablets, computers, and so on. For example, the client device interface 220 may provide one or more apps or browser-based interfaces that can be accessed by users, such as the users 135, using client devices, such as the client devices 130. The client device interface 220 enables the users to submit requests to a ride service provided or enabled by the fleet management system 120. In particular, the client device interface 220 enables a user to submit a ride request that includes an origin (or pickup) location and a destination (or drop-off) location. The ride request may include additional information, such as a number of passengers traveling with the user, and whether or not the user is interested in a shared ride with one or more other passengers not known to the user.

The client device interface 220 can also enable users to select ride settings. The client device interface 220 can provide one or more options for the user to engage in a virtual environment, such as whether to interact with another person, whether to involve in an entertainment activity, and so on. The client device interface 220 may enable a user to opt-in to some, all, or none of the virtual activities offered by the ride service provider. The client device interface 220 may further enable the user to opt-in to certain monitoring features, e.g., to opt-in to have the interior sensors 440 obtain sensor data of the user. The client device interface 220 may explain how this data is used by the service manager 210 (e.g., for providing support to the user, etc.) and may enable users to selectively opt-in to certain monitoring features, or to opt-out of all of the monitoring features. In some embodiments, the user support platform may provide a modified version of a virtual activity if a user has opted out of some or all of the monitoring features.

The user support module 230 may receive support requests from passengers of AVs through the client device interface 220 or the onboard computer 150. The user support module 230 manages the support requests. In some embodiments, the user support module 230 maintains a queue of pending support requests, in which the pending support requests may be arranged in an order. A pending support request is a support request that has not been completed. A support request may be considered completed after the support requested by the passenger has been provided or the issue that triggered the support request has been resolved.

The user support module 230 may assign the pending support requests to agents based on the order in the queue. The agent can interact with the passenger and provide support to the passenger. An agent may be associated with a device in communication with the user support module 230. The device may be a desktop or a laptop computer, a smartphone, a mobile telephone, a PDA, or another suitable device. The user support module 230 may send information related to support requests assigned to the agent to the agent's device. The information may include the support requests and guidance on how to provide the requested support.

In some embodiments, the user support module 230 determines a state (e.g., a sentiment) of a passenger who submitted a support request and processes the support request based on the passenger's state. The user support module 230 may determine the passenger's state based on data of the passenger, data of the AV, data of one or more objects in an environment surrounding the passenger or AV, or some combination thereof. The data may include sensor data generated by the sensor suite 140 from detecting the passenger, AV, one or more objects in the environment, or some combination thereof. For instance, the user support module 230 may interface with AVs 110 (e.g., with onboard computers of the AVs 110) and receive sensor data from the AVs 110. The sensor data may be camera images, captured sound, measured temperature, other outputs from the sensor suite 140, or some combination thereof. The data may also include data retrieved by the user support module 230 from the user datastore 240 or map datastore 250. In an embodiment, the user support module 230 may provide the data to a trained model and the train model analyzes the sentiment of the passenger. The trained model may classify the passenger's sentiment. Example categories include negative (e.g., anxious, angry, etc.), neural (e.g., calm), positive (e.g., confident, happy, etc.), and so on. The trained model may also estimate a degree of the passenger's sentiment, such as an anxiety level or anger level.

The user support module 230 may assign the support request to an agent based on the passenger's state. For instance, based on a determination that the passenger is anxious, the user support module 230 may assign the support request to a currently available agent or the next available agent so that the waiting time of the passenger can be minimized. The agent, who receives the support request, can help the passenger to deal with the issue. The agent may communicate with the passenger, e.g., through an audio or video call.

The user datastore 240 stores information associated with delivery services received by users (e.g., the users 135). The user datastore 240 may store a user profile associated with the user. The user profile may include historical data of a user, such as data of one or more historical deliveries to a user. The historical data of the user may include information of items delivered to the user, pick-up locations, drop-off locations, delivery times, or other information of the historical deliveries. The historical data of the user may also include information associated with communications with the user for items delivered to the user, such as one or more messages sent to the user, feedback from the user, and so on. In some cases, the user profile may also include future data, e.g., data of one or more future deliveries to the user. Some or all of the data of a user in the user datastore 240 may be received through the client device interface 220, an onboard computer (e.g., the onboard computer 150), a sensor suite of AVs 110 (e.g., the sensor suite 140), a client device associated with the user (e.g., a client device 130), a third-party system associated with the user and the fleet management system 120 (e.g., the third-party system 160), or other systems or devices.

In some embodiments, the user profile also includes data indicating user preferences for autonomous delivery, such as user preference for drop-off location, user preference for delivery time, user tolerance or preference for carrying items, and so on. The fleet management system 120 may include one or more learning modules (not shown in FIG. 2) to learn user preferences based on user data. For example, a learning module may compare locations in the user datastore 240 with map datastore 250 to identify places where the user has picked up items delivered by AVs. For example, the learning module may compare a drop-off location of a delivery to the user in the user datastore 240 to an entry in the map datastore 250 that describes a building at that address. The map datastore 250 may indicate a building type, e.g., to determine that an item was dropped off at an event center, a restaurant, or a movie theater. As another example, the learning module may identify times when items have been delivered to the user and determine user preference for delivery time.

In some embodiments, a learning module may learn user tolerance or preference for carrying items from drop-off locations to target location, e.g., based on information associated with communications that have been sent to or received from the user in association with delivery services. The learning module may learn that the user has a high tolerance for carrying items based on the user's rejection or lack of response to an option allowing the user whether to change the drop-off location. Similarly, the learning module may learn that the user has a low tolerance for carrying items based on information indicating that the user has requested to change delivery time or drop-off location because the items were too big or heavy.

The user datastore 240 may also store information associated with ride services received by users (e.g., the users 135). In some embodiments, the user datastore 240 stores user sentiments associated with rides taken by the user 135. The user sentiments may be determined by the user support module 230. The user datastore 240 may store an origin location and a destination location for a user's current ride. The user datastore 240 may also store historical ride data for a user, including origin and destination locations, dates, and times of previous rides taken by a user. The historical data of the user may also include information associated with historical support requests made by the user during the previous rides, such as sensor data associated with the historical support requests, communications of the user with agents that serviced the historical support requests, states of the user during the communications, information of AVs 110 associated with the historical support requests, and so on. The historical data of the user may also include information associated with communications of AVs with the user for AV behaviors in historical rides taken by the user. In some cases, the user datastore 240 may further store future ride data, e.g., origin and destination locations, dates, and times of planned rides that a user has scheduled with the ride service provided by the AVs 110 and fleet management system 120. Some or all of the data of a user in the user datastore 240 may be received through the client device interface 220, an onboard computer (e.g., the onboard computer 150), a sensor suite of AVs 110 (e.g., the sensor suite 140), a third-party system associated with the user and the fleet management system 120, or other systems or devices.

In some embodiments, the user datastore 240 also stores data indicating user preferences associated with rides in AVs. The fleet management system 120 may include one or more learning modules (not shown in FIG. 2) to learn user interests based on user data. For example, a learning module may compare locations in the user datastore 240 with map datastore 250 to identify places the user has visited or plans to visit. For example, the learning module may compare an origin or destination address for a user in the user datastore 240 to an entry in the map datastore 250 that describes a building at that address. The map datastore 250 may indicate a building type, e.g., to determine that the user was picked up or dropped off at an event center, a restaurant, or a movie theater. In some embodiments, the learning module may further compare a date of the ride to event data from another data source (e.g., a third-party event data source, or a third-party movie data source) to identify a more particular interest, e.g., to identify a performer who performed at the event center on the day that the user was picked up from an event center, or to identify a movie that started shortly after the user was dropped off at a movie theater. This interest (e.g., the performer or movie) may be added to the user datastore 240. As another example, a learning module may learn user tolerance or preference for AV behaviors, e.g., based on information associated with communications of AVs with the user for AV behaviors in historical rides taken by the user. The learning module may learn that the user has a high tolerance for an AV behavior based on information indicating that the user had no bad feelings for the AV behavior undesirable in one or more previous rides. Similarly, the learning module may learn that the user has a low tolerance for a type of AV behavior based on information indicating that the user had negative sentiments towards the AV behavior in one or more previous rides.

The map datastore 250 stores one or more maps of environments through which the AVs 110 may travel. A map may be a semantic map or vector map. The map datastore 250 includes data describing roadways, such as e.g., locations of roadways, connections between roadways, roadway names, speed limits, traffic flow regulations, toll information, etc. The map datastore 250 may further include data describing buildings (e.g., locations of buildings, building geometry, building types), and data describing other objects (e.g., location, geometry, object type) that may be in the environments of AV 110. The map datastore 250 may also include data describing other features, such as bike lanes, sidewalks, crosswalks, traffic lights, parking lots, signs, billboards, etc.

Some of the map datastore 250 may be gathered by the fleet of AVs 110. For example, images obtained by the exterior sensors 410 of the AVs 110 may be used to learn information about the AVs' environments. As one example, AVs may capture images in a residential neighborhood during the Christmas season, and the images may be processed to identify which homes have Christmas decorations. The images may be processed to identify particular features in the environment. For the Christmas decoration example, such features may include light color, light design (e.g., lights on trees, roof icicles, etc.), types of blow-up figures, etc. The fleet management system 120 and/or AVs 110 may have one or more image processing modules to identify features in the captured images or other sensor data. This feature data may be stored in the map datastore 250. In some embodiments, certain feature data (e.g., seasonal data, such as Christmas decorations, or other features that are expected to be temporary) may expire after a certain period of time. In some embodiments, data captured by a second AV 110 may indicate that a previously-observed feature is no longer present (e.g., a blow-up Santa has been removed) and in response, the fleet management system 120 may remove this feature from the map datastore 250.

The vehicle manager 260 manages and communicates with the fleet of AVs 110. The vehicle manager 260 assigns the AVs 110 to various tasks and directs the movements of the AVs 110 in the fleet. The vehicle manager 260 includes a vehicle manager 260 and an AV 110 interface 290. In some embodiments, the vehicle manager 260 includes additional functionalities not specifically shown in FIG. 2. For example, the vehicle manager 260 instructs AVs 110 to drive to other locations while not servicing a user, e.g., to improve geographic distribution of the fleet, to anticipate demand at particular locations, etc. The vehicle manager 260 may also instruct AVs 110 to return to an AV 110 facility for fueling, inspection, maintenance, or storage.

In some embodiments, the vehicle manager 260 selects AVs from the fleet to perform various tasks and instructs the AVs to perform the tasks. For example, the vehicle manager 260 receives a ride request from the client device interface 220. The vehicle manager 260 selects an AV 110 to service the ride request based on the information provided in the ride request, e.g., the origin and destination locations. If multiple AVs 110 in the AV 110 fleet are suitable for servicing the ride request, the vehicle manager 260 may match users for shared rides based on an expected compatibility. For example, the vehicle manager 260 may match users with similar user interests, e.g., as indicated by the user datastore 240. In some embodiments, the vehicle manager 260 may match users for shared rides based on previously-observed compatibility or incompatibility when the users had previously shared a ride.

The vehicle manager 260 or another system may maintain or access data describing each of the AVs in the fleet of AVs 110, including current location, service status (e.g., whether the AV 110 is available or performing a service; when the AV 110 is expected to become available; whether the AV 110 is schedule for future service), fuel or battery level, etc. The vehicle manager 260 may select AVs for service in a manner that optimizes one or more additional factors, including fleet distribution, fleet utilization, and energy consumption. The vehicle manager 260 may interface with one or more predictive algorithms that project future service requests and/or vehicle use, and select vehicles for services based on the projections.

The vehicle manager 260 transmits instructions dispatching the selected AVs. In particular, the vehicle manager 260 instructs a selected AV 110 to drive autonomously to a pickup location in the ride request and to pick up the user and, in some cases, to drive autonomously to a second pickup location in a second ride request to pick up a second user. The first and second user may jointly participate in a virtual activity, e.g., a cooperative game or a conversation. The vehicle manager 260 may dispatch the same AV 110 to pick up additional users at their pickup locations, e.g., the AV 110 may simultaneously provide rides to three, four, or more users. The vehicle manager 260 further instructs the AV 110 to drive autonomously to the respective destination locations of the users.

The item datastore 270 stores information of items for which delivery requests were received by the fleet management system 120. The item datastore 270 may associate an item profile with one or more items. An item profile may include information about the item, such as category, details, specifications, size, weight, preferred temperature, identifying information, ingredients, quantity, packaging information, number of trips it would take for a user to complete a delivery, other information, or some combination thereof. An item profile may include a classification of the item that indicates whether communication with users is needed for delivering the item to the users. For instance, the item profile may include a classification label indicating the item is an item requiring communication or an item not requiring communication. Data included in the item profile may be from the client device interface 220, the delivery message manager 280, the third-party system 160, one or more client devices 130, and so on.

The delivery message manager 280 provides a communication platform for communicating with users for delivery of items. The delivery message manager 280 determines whether to communicate with a user for delivery of an item to the user based on an attribute of the user. The attribute may indicate an extent of ease of the user carrying the item from a predetermined location, such as the predetermined drop-off location of the delivery. The delivery message manager 280 may determine whether the extent of ease of the user carrying the item exceeds the preference or tolerance of the user carrying items. In embodiments where the extent of ease of the user carrying the item exceeds the preference or tolerance of the user carrying items, the delivery message manager 280 generates one or more messages to inform the user of the attribute of the items. A message may include a recommendation for carrying the item, such as using a tool, getting help from another person, and so on. The delivery message manager 280 may allow the user to change the delivery based on the attribute of the item. For instance, the delivery message manager 280 may facilitate a change in the drop-off location, delivery time, or other settings of the delivery. Certain aspects of the delivery message manager 280 are described below in conjunction with FIG. 3.

Figure 3:
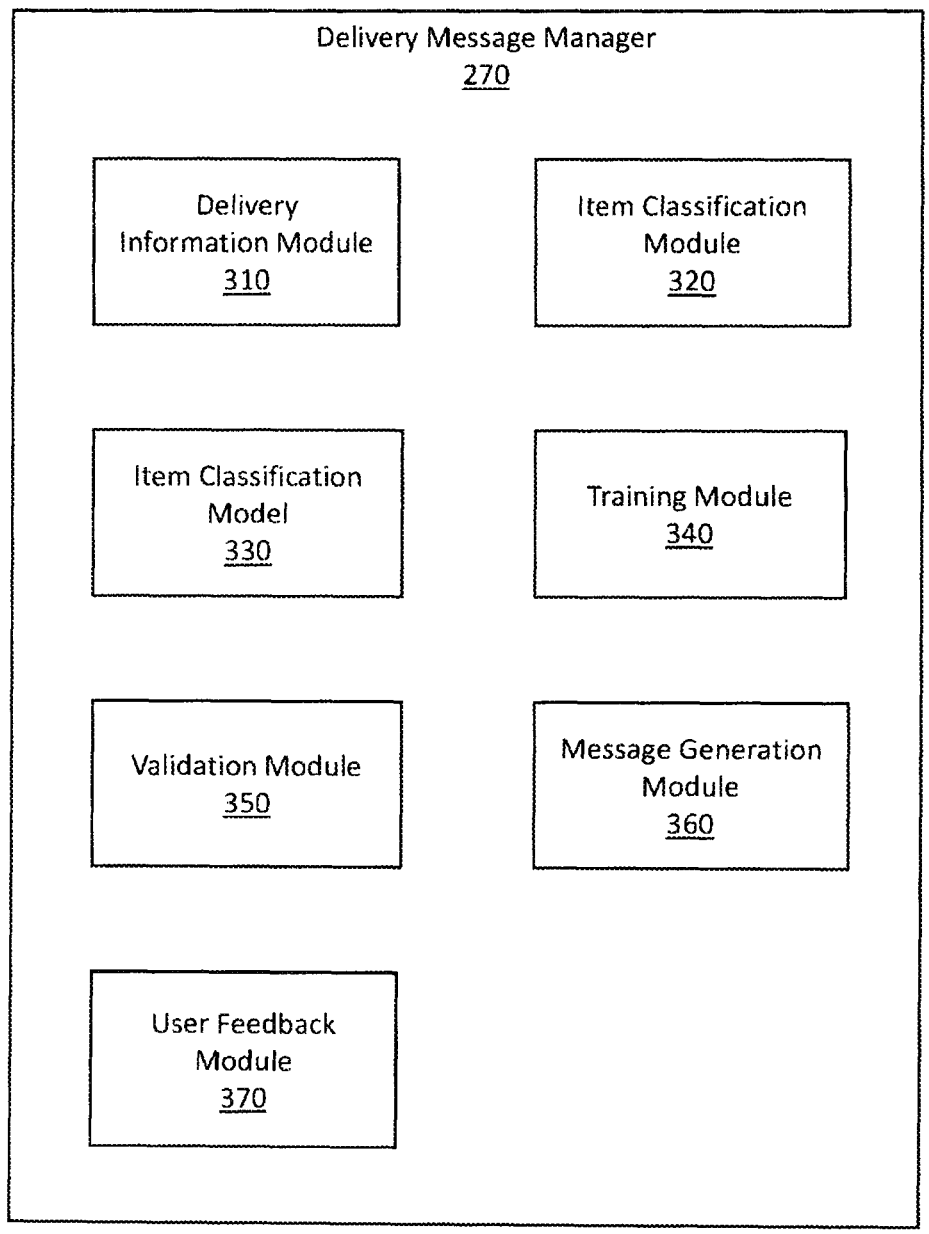
FIG. 3 is a block diagram showing a delivery message manager, according to some embodiments of the present disclosure.

FIG. 3 is a block diagram showing the delivery message manager 280, according to some embodiments of the present disclosure. The delivery message manager 280 includes a delivery information module 310, an item classification module 320, an item classification model 330, a training module 340, a validation module 350, a message generation module 360, and a user feedback module 370. In alternative configurations, different and/or additional components may be included in the delivery message manager 280. Further, functionality attributed to one component of the delivery message manager 280 may be accomplished by a different component included in the delivery message manager 280, a different component in the fleet management system 120, the onboard computer 150, or a different system or device.

The delivery information module 310 obtains information associated with delivery services. The information is to be used by other components of the delivery message manager 280 to communicate with the users of the delivery services. In some embodiments, the delivery information module 310 obtains information about an item to be delivered to a user through a delivery service. The information about the item may include information indicating item category, item details, specifications, size, weight, preferred temperature, identifying information, ingredients, quantity, packaging information, other information, or some combination thereof.

The delivery information module 310 may obtain the information about the item from one or more sources. The one or more sources may include a third-party system associated with the item, one or more sensors of the AV, the client device interface 220, the item datastore 270, or other sources. In some embodiments, the delivery information module 310 may send a request for the information about the item to a third-party system. The third-party system may be an online system that is maintained by a third-party, such as the third-party that provides the item. Alternatively, the delivery information module 310 may retrieve the information about the item from the third-party system, e.g., through an API of the third-party system. Additionally or alternatively, the third-party system may send a request for the delivery service to the fleet management system 120, e.g., to the client device interface 220.

The request may include the information of the item, and the delivery information module 310 may receive the information of the item from the client device interface 220. The delivery information module 310 may receive sensor data from the AV. The sensor data may be generated by one or more sensors in the AV that detects the item. For instance, the delivery information module 310 may send a request for detecting the item to the onboard computer 150 and the onboard computer 150 may instruct the sensor suite 140 to detect the item. The one or more sensors may include camera, LIDAR, weight transducer, or other types of sensors. In some embodiments, the delivery information module 310 may determine whether the item is associated with an item profile in the item datastore 270. In embodiments where the item datastore 270 maintains a profile of the item (or a similar item), the delivery information module 310 may retrieve the profile from the item datastore 270.

In some embodiments, the delivery information module 310 also obtains information about the user receiving the item. Information about the user may include information indicating a preference or tolerance of the user carrying items, information about historical delivery services from which the user received items, other information associated with the user, or some combination thereof. The delivery information module 310 may obtain the information about the user from the third-party system, e.g., through the API or from the client device interface 220 as described above. Additionally or alternatively, the delivery information module 310 may obtain the information of the user from the user datastore 240, such as a user profile stored in the user datastore 240. The delivery information module 310 may also receive user information from a client device associated with the user. For instance, the user may provide information through a UI run on the client device. The UI may be facilitated by the client device interface 220.

The delivery information module 310 may also obtain information about the user from one or more sensors of the AV. For instance, the delivery information module 310 may instruct the onboard computer 150 (e.g., the sensor interface 520 or perception module 530 in the onboard computer 150) to capture sensor data and determine a preference or tolerance of the user carrying items based on the sensor data. In some embodiments, the delivery information module 310 may instruct one or more sensors of the AV to monitor at least part of the pick-up process. The sensor data may capture one or more features of the user, actions of the user, lack of action of the user (e.g., elapsed time before the user picks up the item), or other attributes of the user that may indicate a preference or tolerance of the user carrying items. The delivery information module 310 may provide the information of the item or the information of the user to the item classification module 320 or the message generation module 360.

The item classification module 320 determines whether to communicate with a user for a service of delivering an item to the user. The item classification module 320 may classify the item into a category requiring communication or a category not requiring communication. After classifying the item into the category requiring communication, the item classification module 320 determines to communicate with the user for the delivery service. After classifying the item into the category not requiring communication, the item classification module 320 determines not to communicate with the user for the delivery service.

In some embodiments, the item classification module 320 may determine an attribute of the item(s) based on the information of the item from the delivery information module 310. The attribute may indicate the extent of ease of the user to carry the item(s) from the drop-off location of the AV. Examples of the attribute may include size, weight, number of trips needed by the user to carry the item(s), packaging condition, temperature, shape, quantity, other attributes, or some combination thereof. The item classification module 320 may classify the item based on the attribute of the item. In an example, the item classification module 320 may classify the item into the category requiring communication based on a determination that the size or weight of the item exceeds a threshold. The threshold may be a threshold size or weight beyond which it would be hard for the user to carry the item. In another example, the item classification module 320 may classify the item into the category requiring communication based on a determination that the item needs special care. For instance, the item needs temperature control (e.g., the item needs to be kept at temperatures lower or higher than the room temperature), special handling, special packaging, and so on. In yet another example, the item classification module 320 may classify the item(s) into the category requiring communication based on a determination that it would take multiple trips for the user to carry the item(s) from the drop-off location to the desired location.

In some embodiments, the item classification module 320 may determine the attribute of the item based on a category of the item from a third-party system associated with the item. For example, the item classification module 320 may determine that the item has a large size and classify the item into the category requiring communication based on that the third-party system classifies the item as a large item. As another example, the item classification module 320 may determine that the item has a small size and classify the item into the category not requiring communication based on that the third-party system classifies the item as a small item. In some embodiments, the item classification module 320 may take into account variations in classifications by different third-party systems. For instance, the item classification module 320 may determine that an item, which is classified by a third-party system as a small item, has a large size and classify the item into the category requirement communication based on information indicating one or more classification criteria of the third-party system, e.g., information indicating that small items associated with the third-party system have sizes beyond the threshold size.

In some embodiments, the classification of the item can be personalized to the user receiving the item. The item classification module 320 may classify the item based on one or more attributes of the item and information indicating a preference or tolerance of the user carrying items, e.g., the information about the user from the delivery information module 310. For instance, the item classification module 320 may determine a threshold size or weight based on information about the user. The item classification module 320 may determine whether the size or weight of the item exceeds the threshold size or weight. Different users may have different threshold sizes or weights given differences in their preferences or capabilities of carrying items.

In some embodiments, after the item classification module 320 has classified an item, the item classification module 320 may modify the classification of the item based on information obtained from monitoring at least part of the pick-up process. For instance, the item classification module 320 may receive information of the item or user, which may be determined based on sensor data captured by one or more sensor of the AV during the pick-up process, after the initial classification of the item has been determined. The item classification module 320 may determine that the information of the item or user may be different from or not included in the information used to generate the one or more messages. After such a determination, the item classification module 320 may modify the classification of the item based on the new information.

In some embodiments, the item classification module 320 classifies the item using the item classification model 330. The item classification module 320 may input information about the item (e.g., information about the item from the delivery information module 310, one or more attributes of the item determined by the item classification module 320, or some combination thereof) into the item classification model 330. The item classification module 320 may input information about the user (e.g., information about the item from the delivery information module 310) into the item classification model 330. The item classification model 330 may process the input and output a determination of whether to communicate with the user for the delivery of the item.

The item classification model 330 may be a machine learning model that can determine whether to communicate with users for autonomous delivery. The item classification model 330 may be trained by the training module 340. In some embodiments, the item classification model 330 may have a neural network architecture that includes an input layer, a plurality of hidden layers, and an output layer. The training module 340 may train the item classification model 330 by using a training dataset. The training module 340 may form the training dataset. The training dataset may include training samples and training labels. A training sample may include information about an item delivered by an AV to a user. The training sample may also include information about the user. A training sample may be associated with one or more training labels. A training label may include a ground-truth classification of the delivered item. The ground-truth classification of the delivered item may be a known or verified classification of the delivered item. For instance, a training label may indicate that a correct classification of the item into the category requiring communication as the user has confirmed that the communication was helpful. In some embodiments, the training module 340 may form the training dataset by mining one or more operation logs of one or more AVs.

The training module 340 may extract features from the training dataset. The features may be variables deemed potentially relevant to the task to be performed by the item classification model 330. An ordered list of the features may be a feature vector. In some embodiments, the training module 340 may apply dimensionality reduction (e.g., via linear discriminant analysis (LDA), principal component analysis (PCA), or the like) to reduce the amount of data in the feature vectors to a smaller, more representative set of data. The training module 340 may use supervised machine learning to train the model. Different machine learning techniques-such as linear support vector machine (linear SVM), boosting for other algorithms (e.g., AdaBoost), neutral networks, logistic regression, naïve Bayes, memory-based learning, random forests, bagged trees, decision trees, boosted trees, or boosted stumps—may be used in different embodiments.

In some embodiments, the training module 340 may determine hyperparameters for training the item classification model 330. Hyperparameters are variables specifying the item classification model 330 training process. Hyperparameters are different from parameters inside the item classification model 330 (e.g., weights of filters). In some embodiments, hyperparameters include variables determining the architecture of the item classification model 330, such as number of hidden layers, etc. Hyperparameters also include variables which determine how the item classification model 330 is trained, such as batch size, number of epochs, etc. A batch size defines the number of training samples to work through before updating the parameters of the item classification model 330. The batch size is the same as or smaller than the number of samples in the training dataset. The training dataset can be divided into one or more batches. The number of epochs defines how many times the entire training dataset is passed forward and backwards through the entire network. The number of epochs defines the number of times that the deep learning algorithm works through the entire training dataset. One epoch means that each training sample in the training dataset has had an opportunity to update the parameters inside the item classification model 330. An epoch may include one or more batches. The number of epochs may be 4, 40, 500, 400, or even larger.

The training module 340 may define the architecture of the item classification model 330, e.g., based on some of the hyperparameters. The architecture of the item classification model 330 includes an input layer, an output layer, and a plurality of hidden layers. The input layer of the item classification model 330 may include data from the sensor suite 140, data from the onboard computer 150, or some combination thereof. The output layer may include zone edges, per-point drivability, per-point traffic derivatives, vectorized regions, and so on. The hidden layers are layers between the input layer and output layer. Examples of the hidden layers may include one or more convolutional layers and one or more other types of layers, such as pooling layers, fully connected layers, normalization layers, Softmax or logistic layers, and so on.

After the training module 340 defines the architecture of the item classification model 330, the training module 340 inputs the training samples into the item classification model 330. The training module 340 modifies the parameters inside the item classification model 330 ("internal parameters of the item classification model 330") to minimize the error between outputs of the item classification model 330 and the ground-truth labels of the training samples. The internal parameters include weights of filters in the convolutional layers of the item classification model 330. In some embodiments, the training module 340 uses a cost function to minimize the error.

The training module 340 may train the item classification model 330 for a predetermined number of epochs. The number of epochs is a hyperparameter that defines the number of times that the deep learning algorithm will work through the entire training dataset. One epoch means that each sample in the training dataset has had an opportunity to update internal parameters of the item classification model 330. After the training module 340 finishes the predetermined number of epochs, the training module 340 may stop updating the parameters in the item classification model 330. The item classification model 330 having the updated parameters is referred to as a trained item classification model 330.

The validation module 350 verifies the accuracy of the item classification model 330 after the item classification model 330 is trained. In some embodiments, the validation module 350 may use a validation dataset to verify the accuracy of the item classification model 330. The validation dataset may include a plurality of validation samples and ground-truth labels of the validation samples. A validation sample may include information about an item delivered by an AV to a user. The validation sample may also include information about the user receiving the item. A validation label may include a ground-truth classification of the delivered item. The ground-truth classification of the delivered item may be a known or verified classification of the delivered item. For instance, a validation label may indicate that a correct classification of the item into the category requiring communication as the user has confirmed that the communication was helpful.

The validation module 350 may input samples in the validation samples into the item classification model 330 and uses the labels of the validation samples generated by the item classification model 330 to verify the accuracy. In some embodiments, the validation dataset may be formed of some or all the samples in the training dataset. Additionally or alternatively, the validation dataset includes additional samples, other than those in the training sets. The accuracy of the item classification model 330 may be indicated by a ratio of the number of validation samples that the item classification model 330 correctly classified to the total number of validation samples in the validation dataset.

In some embodiments, the validation module 350 may determine an accuracy score measuring the precision, recall, or a combination of precision and recall of the item classification model 330. The validation module 350 may use the following metrics to determine the accuracy score: Precision=TP/(TP+FP) and Recall=TP/(TP+FN), where precision may be how many validation samples the item classification model 330 correctly classified (TP or true positives) out of all the validation samples it classified (TP+FP or false positives), and recall may be how many the validation samples the item classification model 330 correctly classified (TP) out of the total number of validation samples that did fall into the classification (TP+FN or false negatives). The F-score (F-score=2*PR/(P+R)) unifies precision and recall into a single measure.

The validation module 350 may compare the accuracy score with a threshold score. In an example where the validation module 350 determines that the accuracy score of the augmented model is lower than the threshold score, the validation module 350 instructs the training module 340 to re-train the item classification model 330. In one embodiment, the training module 340 may iteratively re-train the item classification model 330 until the occurrence of a stopping condition, such as the accuracy measurement indication that the item classification model 330 may be sufficiently accurate, or a number of training rounds having taken place.

The message generation module 360 generates messages for communicating with users for autonomous delivery, such as messages informing users of items that can be difficult for the users to carry. In some embodiments, the message generation module 360 generates one or more messages for an item that has been classified into the category requiring communication by the item classification module 320. The messages may be specific to the item and the user. The message generation module 360 may generate the messages based on information of the item and information of the user from the delivery information module 310 or the item classification module 320. A message for the item may describe the attribute of the item that caused the item classification module 320 to classify the item into the category requiring communication. As an example, the message may indicate that the item is big or heavy. In some embodiments, a message may include other information about the item, such as information about the item obtained by the delivery information module 310. For instance, the message may include a description of the item, a category of the item, a desirable temperature, and so on. The message may also include sensor data from one or more sensors of the AV that detected the item, such as an image of the item captured by a camera in the AV.

In some embodiments, a message of the item may also include a recommendation for the user to handle the item considering the attribute of the item. In situations where the item is big or heavy, the message may include a recommendation of using a tool (e.g., cart, bag, etc.) to carry the item or getting help from one or more other people. In situations where the item needs temperature control, the message may include a recommendation of bringing a cooler to the drop-off location.

A message may include one or more options for the user to modify the delivery service. For instance, the message may facilitate a UI or include a link to a UI that allows the user to modify the delivery time, the drop-off location, or other settings of the delivery service.

In some embodiments, a message may include one or more options for the user to modify the delivery time in light of the attribute of the item. The message may enable the user to select a delivery time that is different from the originally scheduled delivery time. The user can select a time when the user can have access to a tool or can get help for carrying the item.

In some embodiments, the message generation module 360 may determine a new drop-off location based on the attribute of the item. The message generation module 360 may determine whether there is an alternative route from the drop-off location to the user's target location (e.g., the user's home, office building, etc.) that can make it easier for the user to carry the item. In an example, the message generation module 360 may determine an alternative drop-off location that is closer to the user's target location. In another example, the message generation module 360 may determine an alternative drop-off location that will make it easier for the user to use a cart to carry the item. The message generation module 360 may determine an alternative drop-off location based on a map, such as a map from the map datastore 250. In an embodiment, the message generation module 360 may change the drop-off location without the user's input. In another embodiment, the message generation module 360 may present the alternative drop-off location to the user and allow the user to determine whether to change the drop-off location. The message generation module 360 may provide the new drop-off location to the AV (e.g., through the vehicle manager 260). The AV will navigate to the new drop-off location, making it easier for the user to bring the item to the target location.

In some embodiments, the message generation module 360 may use a trained model to generate messages. For instance, the message generation module 360 may input information about the item (or information about the item plus information about the user) into the trained model, and the trained model outputs one or more messages to the user. The message generation module 360 may include or be associated with a training module that trains the model with machine learning techniques. In some embodiments, the training module may apply dimensionality reduction (e.g., via LDA, PCA, or the like) to reduce the amount of data in the feature vectors for ride services to a smaller, more representative set of data. The training module may use supervised machine learning to train the model. Different machine learning techniques-such as linear support vector machine (linear SVM), boosting for other algorithms (e.g., AdaBoost), neutral networks, logistic regression, naïve Bayes, memory-based learning, random forests, bagged trees, decision trees, boosted trees, or boosted stumps—may be used in different embodiments. The training module may be the training module 340.

In some embodiments, the trained model may be combined with the item classification model 330. For instance, a combined model may determine whether to communicate with a user and after determining to communicate with a user, the model may generate one or more messages to the user. An example of the combined model may be a neural network including one or more layers for classifying items and one or more other layers for generating messages.

In some embodiments, after one or more messages are generated for a delivery, the message generation module 360 may update a message or generate one or more follow-up messages based on information obtained from monitoring at least part of the pick-up process. For instance, the message generation module 360 may receive information of the item or user, which may be determined based on sensor data captured by one or more sensor of the AV during the pick-up process, after the one or more messages have been generated. The message generation module 360 may determine that the information of the item or user may be different from or not included in the information used to generate the one or more messages. After such a determination, the message generation module 360 may modify the one or more messages or generate one or more follow-up messages based on the new information.

The message generation module 360 may transmit messages to client devices (e.g., client devices 130) associated with users. The message generation module 360 can send out messages through various channels, such as email, SMS (short message service), and so on. In some embodiments, the message generation module 360 may use the client device interface 220 to send out messages.

The user feedback module 370 may query users for feedback on messages sent to the users. In some embodiments, the user feedback module 370 may embed an option for the user to provide feedback on a message in the message itself. In other embodiments, the user feedback module 370 may send a separate request for user feedback to the client device of the user. The user feedback module 370 may generate one or more questions querying whether a message about an item delivered to the user promotes or demotes the user's satisfaction with the delivery service. The user feedback module 370 may also provide an option for the user to provide comments, suggestions, and so on.

In some embodiments, the user feedback module 370 may provide user feedback to the training module 340 for the training module 340 to further train the item classification model 330. For example, the user feedback may indicate that a message about an item helped promote the user's satisfaction with the delivery service, and the training module 340 may form a new training sample that includes information about the item (optionally also includes information about the user) and a ground-truth classification of the item as an item requiring communication. The training module 340 may use the training same as a positive training sample to further train the item classification model 330. As another example, the user feedback may indicate that a message about an item did not help promote the user's satisfaction with the delivery service or even demote the user's satisfaction with the delivery service. The training module 340 may form a new training sample that includes information about the item (optionally also includes information about the user) and a ground-truth classification of the item as an item not requiring communication. The training module 340 may use the training same as a negative training sample to further train the item classification model 330.

Example Sensor Suite

Figure 4:
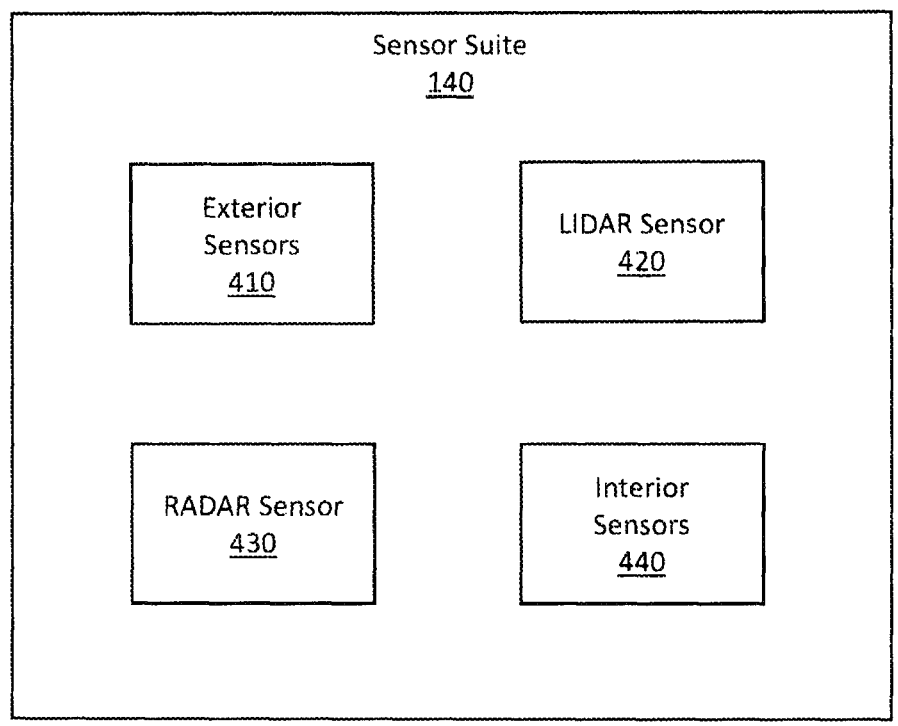
FIG. 4 is a block diagram showing a sensor suite, according to some embodiments of the present disclosure.

FIG. 4 is a block diagram showing the sensor suite 140, according to some embodiments of the present disclosure. The sensor suite 140 may be an onboard sensor suite of an AV, e.g., AV 110 in FIG. 1. The sensor suite 140 includes exterior sensors 410, a LIDAR sensor 420, a RADAR sensor 430, and interior sensors 440. The sensor suite 140 may include any number of the types of sensors shown in FIG. 4, e.g., one or more LIDAR sensors 420, one or more RADAR sensors 430, etc. The sensor suite 140 may have more types of sensors than those shown in FIG. 4, such as the sensors described with respect to FIG. 1. In other embodiments, the sensor suite 140 may not include one or more of the sensors shown in FIG. 4.

The exterior sensors 410 may detect objects in an environment around the AV. The environment may include a scene in which the AV operates. Example objects include objects related to weather (e.g., fog, rain, snow, haze, etc.), persons, buildings, traffic cones, traffic lights, traffic signs, barriers, vehicles, street signs, trees, plants, animals, or other types of objects that may be present in the environment around the AV. In some embodiments, the exterior sensors 410 include exterior cameras having different views, e.g., a front-facing camera, a back-facing camera, and side-facing cameras. One or more exterior sensors 410 may be implemented using a high-resolution imager with a fixed mounting and field of view. One or more exterior sensors 410 may have adjustable field of views and/or adjustable zooms.

In some embodiments, the exterior sensors 410 may operate continually during operation of the AV. In an example embodiment, the exterior sensors 410 capture sensor data (e.g., images, etc.) of a scene in which the AV drives. In other embodiment, the exterior sensors 410 may operate in accordance with an instruction from the onboard computer 150 or an external system, such as the vehicle manager 260 of the fleet management system 120. For instance, the onboard computer 150 or vehicle manager 260 may request the exterior sensors 410 to detect environmental features and to generate sensor data that can be used for detecting or predicting environmental conditions. Some of all of the exterior sensors 410 may capture sensor data of one or more objects in an environment surrounding the AV based on the instruction.

The LIDAR sensor 420 may measure distances to objects in the vicinity of the AV using reflected laser light. The LIDAR sensor 420 may be a scanning LIDAR that provides a point cloud of the region scanned. The LIDAR sensor 420 may have a fixed field of view or a dynamically configurable field of view. The LIDAR sensor 420 may produce a point cloud that describes, among other things, distances to various objects in the environment of the AV.

The RADAR sensor 430 may measure ranges and speeds of objects in the vicinity of the AV using reflected radio waves. The RADAR sensor 430 may be implemented using a scanning RADAR with a fixed field of view or a dynamically configurable field of view. The RADAR sensor 430 may include one or more articulating RADAR sensors, long-range RADAR sensors, short-range RADAR sensors, or some combination thereof.

The interior sensors 440 may detect the interior of the AV, such as objects inside the AV. Example objects inside the AV include items delivered by the AV, passengers, client devices of passengers, components of the AV, items facilitating services provided by the AV, and so on. The interior sensors 440 may include multiple interior cameras to capture different views, e.g., to capture views of an object inside the AV. The interior sensors 440 may be implemented with a fixed mounting and fixed field of view, or the interior sensors 440 may have adjustable field of views and/or adjustable zooms, e.g., to focus on one or more interior features of the AV. The interior sensors 440 may also include one or more weight sensors, such as weight transducers, that can measure weights of items delivered by the AV.

In some embodiments, the interior sensors 440 may operate continually during operation of the AV. In an example embodiment, the interior sensors 440 capture sensor data (e.g., images, etc.) of one or more items delivered by the AV. In other embodiment, the interior sensors 440 may operate in accordance with an instruction from the onboard computer 150 or an external system, such as the delivery message manager 280 of the fleet management system 120. For instance, the onboard computer 150 or delivery message manager 280 may request the interior sensors 440 to detect an item in the AV and to generate sensor data that can be used for communicating with the user receiving the item.

In some embodiments, the interior sensors 440 include one or more input sensors that allow passengers to provide input. For instance, a passenger may use an input sensor to provide feedback on AV behaviors during the ride. The input sensors may include touch screen, microphone, keyboard, mouse, or other types of input devices. In an example, the interior sensors 440 include a touch screen that is controlled by the onboard computer 150. The onboard computer 150 may present messages on the touch screen and receive interaction of the passenger with the messages through the touch screen. A message may include information of one or more undesirable AV behaviors in the ride. In some embodiments, some or all of the interior sensors 440 may operate continually during operation of the AV. In other embodiment, some or all of the interior sensors 440 may operate in accordance with an instruction from the onboard computer 150 or an external system, such as the fleet management system 120.

Example Onboard Computer

Figure 5:
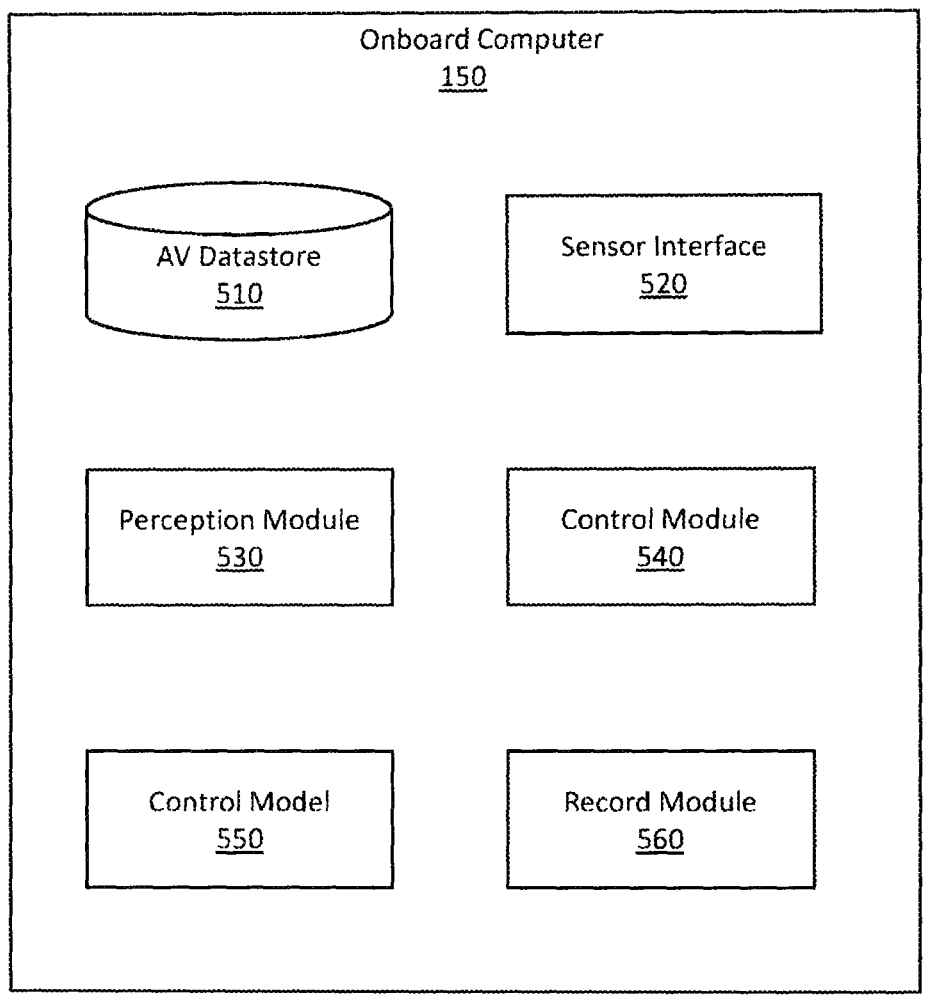
FIG. 5 is a block diagram showing an onboard computer, according to some embodiments of the present disclosure.

FIG. 5 is a block diagram showing the onboard computer 150 according to some embodiments of the present disclosure. The onboard computer 150 may control an AV, e.g., AV 110 in FIG. 1. As shown in FIG. 5, the onboard computer 150 includes an AV datastore 510, a sensor interface 520, a perception module 530, a control module 540, a control model 550, and a record module 560. In alternative configurations, fewer, different and/or additional components may be included in the onboard computer 150. For example, the onboard computer 150 may include more than one control model 550. As another example, components and modules for conducting route planning, controlling movements of the AV, and other vehicle functions are not shown in FIG. 5. Further, functionality attributed to one component of the onboard computer 150 may be accomplished by a different component included in the onboard computer 150 or a different system, such as the fleet management system 120.

The AV datastore 510 stores data associated with operations of the AV. The AV datastore 510 may store one or more operation records of the AV. An operation record is a record of an operation of the AV, e.g., an operation for providing a ride service. The operation may be a currently performed operation or a previously performed operation ("previous operation" or "historical operation"). The operation record may include information indicating operational behaviors of the AV during the operation. The operational behaviors may include sensor detection, movement, stop, battery charging, calibration, maintenance, communication with the fleet management system 120, communication with assistance agent, communication with user, communication with another AV, and so on. The operations record may also include data used, received, or captured by the AV during the operation, such as map data, instructions from the fleet management system 120, sensor data captured by the AV's sensor suite, and so on. In some embodiments, the AV datastore 510 stores a detailed map that includes a current environment of the AV. The AV datastore 510 may store data in the map datastore 250. In some embodiments, the AV datastore 510 stores a subset of the map datastore 250, e.g., map data for a city or region in which the AV is located.

The data in the AV datastore 510 may include data generated by the AV itself. The data may include sensor data capturing one or more environments where the AV operates, e.g., operates to provide services. The sensor data may be from the sensor suite 140 of the AV. The data in the AV datastore 510 may also include perception data that identifies one or more environmental conditions. The perfection data may be from the perception module 530 of the onboard computer 150 of the AV. The data may also include external data, e.g., data from other AVs or systems. For example, the data in the AV datastore 510 may include data (e.g., sensor data, perception, etc.) from one or more other AVs that capture one or more environments where the other AVs operate. As another example, the data in the AV datastore 510 may include data from the fleet management system 120, e.g., data about environmental conditions, instructions (e.g., operational plans) from the vehicle manager 260, etc. In yet another example, the data in the AV datastore 510 may include data from one or more third-party systems that provide information of environments where the AV operates. The AV may be in communication with the one or more third-party systems, e.g., through a network.

The sensor interface 520 interfaces with the sensors in the sensor suite 140. The sensor interface 520 may request data from the sensor suite 140, e.g., by requesting that a sensor capture data in a particular direction or at a particular time. For example, the sensor interface 520 instructs the sensor suite 140 to capture sensor data of an environment surrounding the AV, e.g., by sending a request for sensor data to the sensor suite 140. In some embodiments, the request for sensor data may specify which sensor(s) in the sensor suite 140 to provide the sensor data, and the sensor interface 520 may request the sensor(s) to capture data. The request may further provide one or more settings of a sensor, such as orientation, resolution, accuracy, focal length, and so on. The sensor interface 520 can request the sensor to capture data in accordance with the one or more settings.

A request for sensor data may be a request for real-time sensor data, and the sensor interface 520 can instruct the sensor suite 140 to immediately capture the sensor data and to immediately send the sensor data to the sensor interface 520. The sensor interface 520 is configured to receive data captured by sensors of the sensor suite 140, including data from exterior sensors mounted to the outside of the AV, and data from interior sensors mounted in the passenger compartment of the AV. The sensor interface 520 may have subcomponents for interfacing with individual sensors or groups of sensors of the sensor suite 140, such as a camera interface, a LIDAR interface, a RADAR interface, a microphone interface, etc.

The perception module 530 identifies objects and/or other features captured by the sensors of the AV. The perception module 530 may identify objects inside the AV based on sensor data captured by one or more interior sensors (e.g., the interior sensors 440). For instance, the perception module 530 may identify one or more passengers in the AV. In some embodiments, the perception module 530 identifies objects in the environment of the AV and captured by one or more sensors (e.g., the exterior sensors 410, LIDAR sensor 420, RADAR sensor 430, etc.). As another example, the perception module 530 determines one or more environmental conditions based on sensor data from one or more sensors (e.g., the exterior sensors 410, LIDAR sensor 420, RADAR sensor 430, etc.).

The perception module 530 may include one or more classifiers trained using machine learning to identify particular objects. For example, a multi-class classifier may be used to classify each object in the AV or in the environment of the AV as one of a set of potential objects, e.g., a passenger, a vehicle, a pedestrian, or a cyclist. As another example, a passenger classifier recognizes passengers in the AV, a pedestrian classifier recognizes pedestrians in the environment of the AV, a vehicle classifier recognizes vehicles in the environment of the AV, etc. The perception module 530 may identify facial expressions of people, such as passengers, e.g., based on data from interior cameras. The perception module 530 may identify travel speeds of identified objects based on data from the RADAR sensor 430, e.g., speeds at which other vehicles, pedestrians, or birds are traveling. As another example, the perception module 53—may identify distances to identified objects based on data (e.g., a captured point cloud) from the LIDAR sensor 420, e.g., a distance to a particular vehicle, building, or other feature identified by the perception module 530. The perception module 530 may also identify other features or characteristics of objects in the environment of the AV based on image data or other sensor data, e.g., colors (e.g., the colors of Christmas lights), sizes (e.g., heights of people or buildings in the environment), makes and models of vehicles, pictures and/or words on billboards, etc.

In some embodiments, the perception module 530 fuses data from one or more interior sensors 440 with data from exterior sensors (e.g., exterior sensors 410) and/or AV datastore 510 to identify environmental objects that one or more users are looking at. The perception module 530 determines, based on an image of a user, a direction in which the user is looking, e.g., a vector extending from the user and out of the AV in a particular direction. The perception module 530 compares this vector to data describing features in the environment of the AV, including the features' relative location to the AV (e.g., based on real-time data from exterior sensors and/or the AV's real-time location) to identify a feature in the environment that the user is looking at.

While a single perception module 530 is shown in FIG. 5, in some embodiments, the onboard computer 150 may have multiple perception modules, e.g., different perception modules for performing different ones of the perception tasks described above (e.g., object perception, speed perception, distance perception, feature perception, facial recognition, mood determination, sound analysis, gaze determination, etc.).

The control module 540 controls operations of the AV, e.g., based on information from the sensor interface 520 or the perception module 530. In some embodiments, the control module 540 controls operation of the AV by using the control model 550. The control model 550 may be trained and selected by the vehicle manager 260. Even though FIG. 5 shows a single control model, the control module 540 may use multiple control models to control operations of the AV. The control model 550 may be updated or replaced by one or more new control models over time.

The control module 540 may provide input data to the control model 550, and the control model 550 outputs operation parameters for the AV. The input data may include sensor data from the sensor interface 520 (which may indicate a current state of the AV), objects identified by the perception module 530, data from the fleet management system 120, other data, or some combination thereof. The operation parameters are parameters indicating operation to be performed by the AV. The operation of the AV may include perception, prediction, planning, localization, motion, navigation, other types of operation, or some combination thereof.

The control module 540 may provide instructions to various components of the AV based on the output of the control model, and these components of the AV will operate in accordance with the instructions. In an example where the output of the control model indicates that a change of traveling speed of the AV is required given a prediction of traffic condition, the control module 540 may instruct the motor of the AV to change the traveling speed of the AV. In another example where the output of the control model indicates a need to detect characteristics of an object in the environment around the AV (e.g., detect a speed limit), the control module 540 may instruct the sensor suite 140 to capture an image of the speed limit sign with sufficient resolution to read the speed limit and instruct the perception module 530 to identify the speed limit in the image.

The record module 560 generates operation records of the AV and stores the operations records in the AV datastore 510. The record module 560 may generate an operation record in accordance with an instruction from the fleet management system 120, e.g., the vehicle manager 260. The instruction may specify data to be included in the operation record. The record module 560 may determine one or more timestamps for an operation record. In an example of an operation record for a ride service, the record module 560 may generate timestamps indicating the time when the ride service starts, the time when the ride service ends, times of specific AV behaviors associated with the ride service, and so on. The record module 560 can transmit the operation record to the fleet management system 120.

Example Communication with User for Autonomous Delivery

FIG. 6 illustrates messages 610 and 620 sent to a user for delivery of an item to the user, according to some embodiments of the present disclosure. The messages 610 and 620 may be generated by the delivery message manager 280, such as the message generation module 360 in the delivery message manager 280. The messages 610 and 620 are sent to a client device associated with the user, e.g., a client device 130. The client device provides the messages 610 and 620 for display to the user.

The delivery message manager 280 may generate the message 610 after classifying the item into the category requiring communication. For instance, the delivery message manager 280 may determine that the weight of the item exceeds the preference or tolerance of the user. The message 610 includes information about the delivery, such as the drop-off location (i.e., "the gate of your community") and delivery time (i.e., "2 pm today"). The message 610 informs the user that the item could be too heavy to carry by hand. The message 610 also includes a recommendation for using a cart or picking up the item with another person.

The message 610 further provides an option for the user to change the drop-off location and an option to view a photo of the item. As shown in FIG. 6, the message 610 includes buttons that the user can interact with to change the drop-off location and view the photo. For the purpose of illustration, the user selects to change the drop-off location in FIG. 6. Even though not shown in FIG. 6, the user's interaction with the button to change the drop-off location may trigger an UI where the user may specify a new drop-off location or select a drop-off location determined by the delivery message manager 280. The UI can run on the client device. The UI may be facilitated by an application provided by the fleet management system 120 or a webpage.

The user may interact with the button to view the photo. The photo may be provided to the user in the message 610, in a separate message, or in a UI running on the client device. The photo of the item may be generated by a camera of the AV delivering the item. Alternatively, the photo of the item may be from a third-party system associated with the item. In some embodiments, the photo of the item may be retrieved from the item datastore 270.

The message 620 may be provided to the user after the message 610 or even after the delivery is completed. The message 620 queries the user whether the message 610 helps the user. The message 620 includes three emojis for the user to select, including a smiling face indicating that the user is happy for receiving the message 610, a neural face indicating that the user does not have strong feeling towards the message 610, and a sad face indicating that the user is unhappy for receiving the message 610. Even though not shown in FIG. 6, the message 620 may include an option for the user to provide a comment. The user selects the smiling face in FIG. 6, which confirms that the delivery message manager 280 has correctly classified the item. In some embodiments (e.g., embodiments, the delivery message manager 280 uses a trained model to classify the item), the delivery message manager 280 may further train the model based on the user's response. The delivery message manager 280 may form a training sample that includes information about the item (and optionally information of the user). The delivery message manager 280 may generate a ground-truth label indicating that the item falls into the category requiring communication. The delivery message manager 280 can further train the model using the training sample and the ground-truth label.

Example Method of Communication with Users for Autonomous Delivery

Figure 7:
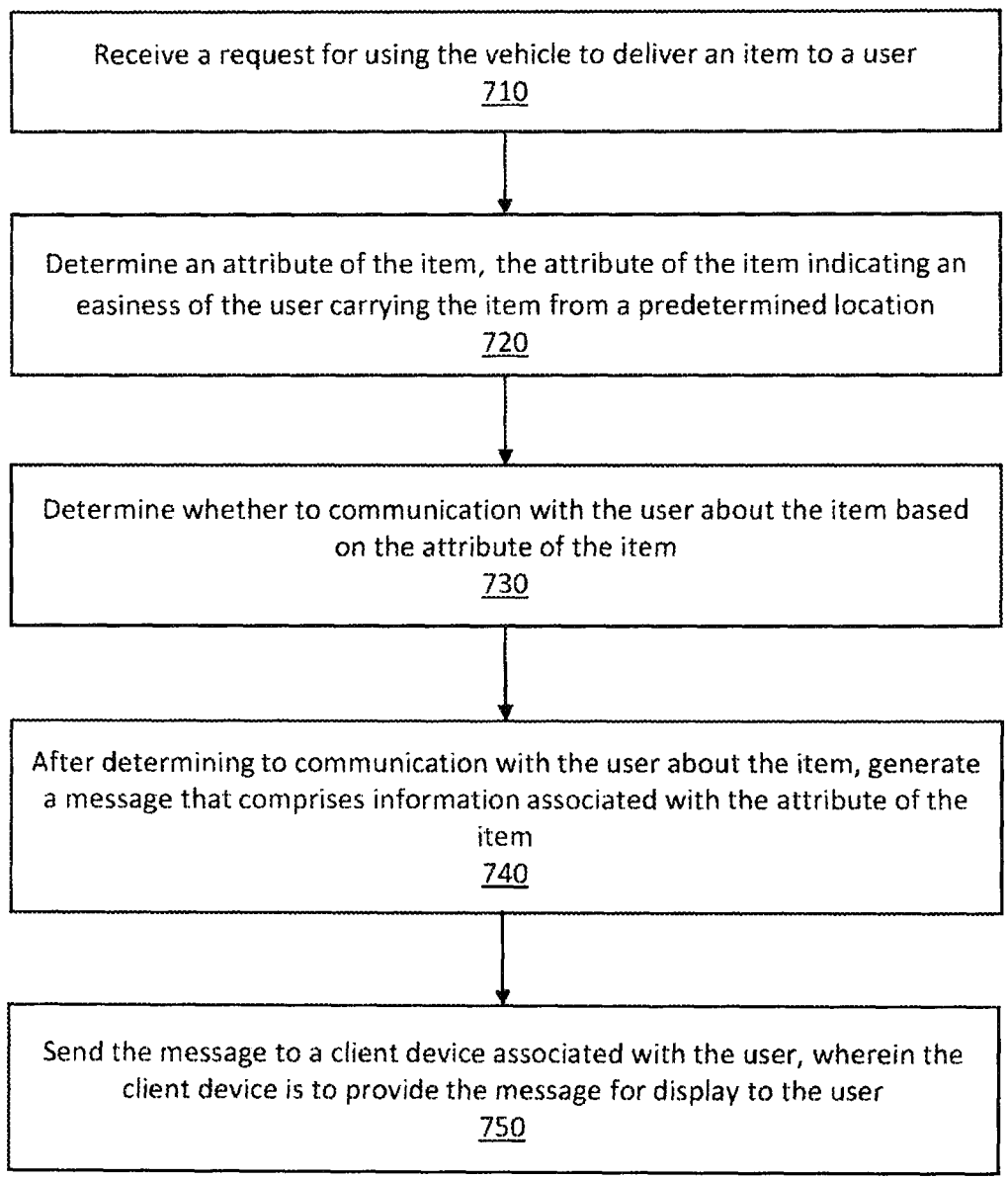
FIG. 7 is a flowchart showing a method of communicating with users for autonomous delivery, according to some embodiments of the present disclosure.

FIG. 7 is a flowchart showing a method 700 of communication with users for autonomous delivery, according to some embodiments of the present disclosure. The method 700 may be performed by the delivery message manager 280. Although the method 700 is described with reference to the flowchart illustrated in FIG. 7, many other methods of communication with users for autonomous delivery may alternatively be used. For example, the order of execution of the steps in FIG. 7 may be changed. As another example, some of the steps may be changed, eliminated, or combined.

The delivery message manager 280 receives 710 a request for using a vehicle to deliver an item to a user. The vehicle may be an AV, e.g., AV 110. The request may be received from a third-party system, such as a system associated with a third-party that provides the item.

The delivery message manager 280 determines 720 an attribute of the item. The attribute of the item indicates the extent of ease of the user carrying the item from a predetermined location. The attribute of the item may be a size, weight, shape, temperature, other types of attributes of the item, or some combination thereof. In some embodiments, the delivery message manager 280 receives information of the item from a third-party system associated with the item. The delivery message manager 280 determines the attribute of the item based on the information of the item. The third-party system may be an online system associated with a third-party that provides the item. In an embodiment, the information of the item indicates a category of the item. The delivery message manager 280 modifies the category of the item to a different category based on information associated with the third-party system and determines the attribute of the item based on the different category. In other embodiments, the delivery message manager 280 receives sensor data generated by one or more sensors of the vehicle, wherein the one or more sensors detect the item. The delivery message manager 280 determines the attribute of the item based on the sensor data.

The delivery message manager 280 determines 730 whether to communicate with the user about the item based on the attribute of the item. In some embodiments, the delivery message manager 280 determines whether to communicate with the user based on the attribute of the item and a user profile. The user profile is associated with the user and maintained by the system associated with the vehicle. In an embodiment, the delivery message manager 280 determines the tolerance or preference of the user to carry one or more items based on the user profile. The delivery message manager 280 determines whether a size or weight of the item exceeds the tolerance or preference of the user.

In some embodiments, the delivery message manager 280 inputs the attribute of the item and an attribute of the user into a trained model. The trained model outputs a determination of whether to communicate with the user. In an embodiment, the delivery message manager 280 receives a response of the user to the message from the client device. The delivery message manager 280 further trains the trained model based on the response of the user.

The delivery message manager 280 generates 740 a message that comprises information associated with the attribute of the item after determining to communication with the user about the item. In some embodiments, the delivery message manager 280 determines a new location based on the attribute of the item and an attribute of the user. The message further comprises an option to replace the predetermined location with the new location as a destination of the vehicle.

The delivery message manager 280 sends 750 the message to a client device associated with the user, wherein the client device is to provide the message for display to the user. In some embodiments, the delivery message manager 280 receives, from the client device, a response of the user. The response indicates a selection of the new location as the destination of the vehicle. The delivery message manager 280 controls navigation of the vehicle to the new location.

Select Examples

Example 1 provides a method, including receiving, by a system associated with a vehicle, a request for using the vehicle to deliver an item to a user; determining, by the system associated with the vehicle, an attribute of the item, the attribute of the item indicating an extent of ease of the user carrying the item from a predetermined location; determining, by the system associated with the vehicle, whether to communicate with the user about the item based on the attribute of the item; after determining to communication with the user about the item, generating, by the system associated with the vehicle, a message that includes information associated with the attribute of the item; and sending, by the system associated with the vehicle, the message to a client device associated with the user, where the client device is to provide the message for display to the user.

Example 2 provides the method of example 1, where determining the attribute of the item includes receiving information of the item from a third-party system associated with the item; and determining the attribute of the item based on the information of the item.

Example 3 provides the method of example 2, where the information of the item indicates a category of the item, and determining the attribute of the item based on the information describing the item includes modifying the category of the item to a different category based on information associated with the third-party system; and determining the attribute of the item based on the different category.

Example 4 provides the method of any of the preceding examples, where determining the attribute of the item includes receiving sensor data generated by one or more sensors of the vehicle, where the one or more sensors detect the item; and determining the attribute of the item based on the sensor data.

Example 5 provides the method of any of the preceding examples, where determining whether to communicate with the user based on the attribute of the item includes determining whether to communicate with the user based on the attribute of the item and a user profile, the user profile associated with the user and maintained by the system associated with the vehicle.

Example 6 provides the method of example 5, where determining whether to communicate with the user based on the attribute of the item and the user profile includes determining a tolerance or preference of the user to carry one or more items based on the user profile; and determining whether a size or weight of the item exceeds the tolerance or preference of the user.

Example 7 provides the method of any of the preceding examples, where determining whether to communicate with the user based on the attribute of the item includes inputting the attribute of the item and an attribute of the user into a trained model, the trained model outputting a determination of whether to communicate with the user.

Example 8 provides the method of example 7, further including receiving, by the system associated with the vehicle from the client device, a response of the user to the message; and further training the trained model based on the response of the user.

Example 9 provides the method of any of the preceding examples, where generating the message includes determining a new location based on the attribute of the item and an attribute of the user, where the message further includes an option for the user to select the location as a destination of the vehicle.

Example 10 provides the method of example 9, further including receiving, by the system associated with the vehicle from the client device, a response of the user, the response indicating a selection of the new location as the destination of the vehicle; and controlling, by the system associated with the vehicle, navigation of the vehicle to the new location.

Example 11 provides one or more non-transitory computer-readable media storing instructions executable to perform operations, the operations including receiving, by a system associated with a vehicle, a request for using the vehicle to deliver an item to a user; determining, by the system associated with the vehicle, an attribute of the item, the attribute of the item indicating an extent of ease of the user carrying the item from a predetermined location; determining, by the system associated with the vehicle, whether to communicate with the user about the item based on the attribute of the item; after determining to communication with the user about the item, generating, by the system associated with the vehicle, a message that includes information associated with the attribute of the item; and sending, by the system associated with the vehicle, the message to a client device associated with the user, where the client device is to provide the message for display to the user.

Example 12 provides the one or more non-transitory computer-readable media of example 11, where determining the attribute of the item includes receiving information of the item from a third-party system associated with the item; and determining the attribute of the item based on the information of the item.

Example 13 provides the one or more non-transitory computer-readable media of example 11 or 12, where determining the attribute of the item includes receiving sensor data generated by one or more sensors of the vehicle, where the one or more sensors detect the item; and determining the attribute of the item based on the sensor data.

Example 14 provides the one or more non-transitory computer-readable media of any one of examples 11-13, where determining whether to communicate with the user based on the attribute of the item includes determining whether to communicate with the user based on the attribute of the item and a user profile, the user profile associated with the user and maintained by the system associated with the vehicle.

Example 15 provides the one or more non-transitory computer-readable media of any one of examples 11-14, where determining whether to communicate with the user based on the attribute of the item includes inputting the attribute of the item and an attribute of the user into a trained model, the trained model outputs a determination of whether to communicate with the user, and the operations further include receiving, by the system associated with the vehicle from the client device, a response of the user to the message; and further training the trained model based on the response of the user.

Example 16 provides the one or more non-transitory computer-readable media of any one of examples 11-15, where generating the message includes determining a new location based on the attribute of the item and an attribute of the user, where the message further includes an option for the user to select the location as a destination of the vehicle.

Example 17 provides the one or more non-transitory computer-readable media of example 16, where the operations further include receiving, by the system associated with the vehicle from the client device, a response of the user, the response indicating a selection of the new location as the destination of the vehicle; and controlling, by the system associated with the vehicle, navigation of the vehicle to the new location.

Example 18 provides a computer system, including a computer processor for executing computer program instructions; and one or more non-transitory computer-readable media storing computer program instructions executable by the computer processor to perform operations including: receiving, by a system associated with a vehicle, a request for using the vehicle to deliver an item to a user, determining, by the system associated with the vehicle, an attribute of the item, the attribute of the item indicating an extent of ease of the user carrying the item from a predetermined location, determining, by the system associated with the vehicle, whether to communicate with the user about the item based on the attribute of the item, after determining to communication with the user about the item, generating, by the system associated with the vehicle, a message that includes information associated with the attribute of the item, and sending, by the system associated with the vehicle, the message to a client device associated with the user, where the client device is to provide the message for display to the user.

Example 19 provides the computer system of example 18, where determining the attribute of the item includes receiving information of the item from a third-party system associated with the item; and determining the attribute of the item based on the information of the item.

Example 20 provides the computer system of example 18 or 19, where determining whether to communicate with the user based on the attribute of the item includes inputting the attribute of the item and an attribute of the user into a trained model, the trained model outputs a determination of whether to communicate with the user, and the operations further include receiving, by the system associated with the vehicle from the client device, a response of the user to the message; and further training the trained model based on the response of the user.

Other Implementation Notes, Variations, and Applications

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

In one example embodiment, any number of electrical circuits of the figures may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processors (inclusive of digital signal processors, microprocessors, supporting chipsets, etc.), computer-readable non-transitory memory elements, etc. can be suitably coupled to the board based on particular configuration needs, processing demands, computer designs, etc. Other components such as external storage, additional sensors, controllers for audio/video display, and peripheral devices may be attached to the board as plug-in cards, via cables, or integrated into the board itself. In various embodiments, the functionalities described herein may be implemented in emulation form as software or firmware running within one or more configurable (e.g., programmable) elements arranged in a structure that supports these functions. The software or firmware providing the emulation may be provided on non-transitory computer-readable storage medium comprising instructions to allow a processor to carry out those functionalities.

It is also imperative to note that all of the specifications, dimensions, and relationships outlined herein (e.g., the number of processors, logic operations, etc.) have only been offered for purposes of example and teaching only. Such information may be varied considerably without departing from the spirit of the present disclosure, or the scope of the appended claims. The specifications apply only to one non-limiting example and, accordingly, they should be construed as such. In the foregoing description, example embodiments have been described with reference to particular arrangements of components. Various modifications and changes may be made to such embodiments without departing from the scope of the appended claims. The description and drawings are, accordingly, to be regarded in an illustrative rather than in a restrictive sense.

Note that with the numerous examples provided herein, interaction may be described in terms of two, three, four, or more components. However, this has been done for purposes of clarity and example only. It should be appreciated that the system can be consolidated in any suitable manner. Along similar design alternatives, any of the illustrated components, modules, and elements of the figures may be combined in various possible configurations, all of which are clearly within the broad scope of this Specification.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. Note that all optional features of the systems and methods described above may also be implemented with respect to the methods or systems described herein and specifics in the examples may be used anywhere in one or more embodiments.

What is claimed is:

1. A method, comprising:
  receiving, by a system associated with a vehicle, a request for using the vehicle to deliver an item to a user at a drop-off location, wherein the vehicle comprises an autonomous vehicle (AV);
  determining, by the system associated with the vehicle, an attribute of the item using sensor data captured by one or more sensors of the vehicle, the attribute of the item comprising at least one of:
    a size of the item;
    a weight of the item; or
    packaging condition of the item;
  determining, by the system associated with the vehicle, whether to communicate with the user about the item based on the attribute of the item and a user profile indicating a preference of the user for physically moving items;
  after determining to communicate with the user about the item, generating, by the system associated with the vehicle, a message that comprises information associated with the attribute of the item and an option to replace the drop-off location with a new location based on the determined attribute and the user profile; and
  sending, by the system associated with the vehicle, the message to a client device associated with the user, wherein the client device is to provide the message for display to the user;
  receiving, by the system associated with the vehicle from the client device, a response indicating a selection of the new location as a destination for the AV; and
  controlling, by the system associated with the vehicle, navigation of the AV to the new location instead of the drop-off location.

2. The method of claim 1, wherein determining the attribute of the item comprises:
  receiving information of the item from a third-party system associated with the item; and
  determining the attribute of the item based on the information of the item.

3. The method of claim 2, wherein the information of the item indicates a category of the item, and determining the attribute of the item based on the information describing the item comprises:
  modifying the category of the item to a different category based on the information of the item from the third-party system; and
  determining the attribute of the item based on the different category.

4. The method of claim 1, wherein
  the sensor data the one or more sensors comprises a camera.

5. The method of claim 1, wherein
  the user profile is associated with the user and is maintained by the system associated with the vehicle.

6. The method of claim 5, wherein determining whether to communicate with the user based on the attribute of the item and the user profile comprises:
  determining whether the size or weight of the item exceeds the preference of the user.

7. The method of claim 1, wherein determining whether to communicate with the user based on the attribute of the item comprises:
  inputting the attribute of the item and an attribute of the user into a trained model, the trained model outputting a determination of whether to communicate with the user.

8. The method of claim 7, further comprising:
  receiving, by the system associated with the vehicle from the client device, a response of the user to the message; and
  further training the trained model based on the response of the user.

9. The method of claim 1, wherein generating the message comprises:
  determining the new location based on the attribute of the item and an attribute of the user.

10. The method of claim 1, wherein the one or more sensors comprises a radar sensor.

11. One or more non-transitory computer-readable media storing instructions executable to perform operations, the operations comprising:

receiving, by a system associated with a vehicle, a request for using the vehicle to deliver an item to a user at a drop-off location, wherein the vehicle comprises an autonomous vehicle (AV);

determining, by the system associated with the vehicle using sensor data captured by one or more sensors of the vehicle, an attribute of the item, the attribute of the item comprising at least one of:
a size of the item;
a weight of the item; or
packaging condition of the item;

determining, by the system associated with the vehicle, whether to communicate with the user about the item based on the attribute of the item and a user profile indicating a preference of the user for physically moving items;

after determining to communicate with the user about the item, generating, by the system associated with the vehicle, a message that comprises information associated with the attribute of the item and an option to replace the drop-off location with a new location based on the determined attribute and the user profile; and sending, by the system associated with the vehicle, the message to a client device associated with the user, wherein the client device is to provide the message for display to the user;

receiving, by the system associated with the vehicle from the client device, a response indicating a selection of the new location as a destination for the AV; and controlling, by the system associated with the vehicle, navigation of the AV to the new location instead of the drop-off location.

12. The one or more non-transitory computer-readable media of claim 11, wherein determining the attribute of the item comprises:
receiving information of the item from a third-party system associated with the item; and
determining the attribute of the item based on the information of the item.

13. The one or more non-transitory computer-readable media of claim 11, wherein
the one or more sensors comprises a camera.

14. The one or more non-transitory computer-readable media of claim 11, wherein
the user profile is associated with the user and is maintained by the system associated with the vehicle.

15. The one or more non-transitory computer-readable media of claim 11, wherein determining whether to communicate with the user based on the attribute of the item comprises inputting the attribute of the item and an attribute of the user into a trained model, the trained model outputs a determination of whether to communicate with the user, and the operations further comprise:
receiving, by the system associated with the vehicle from the client device, a response of the user to the message; and
further training the trained model based on the response of the user.

16. The one or more non-transitory computer-readable media of claim 11, wherein generating the message comprises:
determining the new location based on the attribute of the item and an attribute of the user.

17. The one or more non-transitory computer-readable media of claim 11, wherein the one or more sensors comprises a radar sensor.

18. A computer system, comprising:
a computer processor for executing computer program instructions; and
one or more non-transitory computer-readable media storing the computer program instructions executable by the computer processor to perform operations comprising:
receiving, by a system associated with a vehicle, a request for using the vehicle to deliver an item to a user at a drop-off location, wherein the vehicle comprises an autonomous vehicle (AV);
determining, by the system associated with the vehicle using sensor data captured by one or more sensors of the vehicle, an attribute of the item, the attribute of the item comprising at least one of:
a size of the item;
a weight of the item; or
packaging condition of the item;
determining, by the system associated with the vehicle, whether to communicate with the user about the item based on the attribute of the item and a user profile indicating a preference of the user for physically moving items;
after determining to communicate with the user about the item, generating, by the system associated with the vehicle, a message that comprises information associated with the attribute of the item and an option to replace the drop-off location with a new location based on the determined attribute and the user profile; and
sending, by the system associated with the vehicle, the message to a client device associated with the user, wherein the client device is to provide the message for display to the user;
receiving, by the system associated with the vehicle from the client device, a response indicating a selection of the new location as a destination for the AV; and
controlling, by the system associated with the vehicle, navigation of the AV to the new location instead of the drop-off location.

19. The computer system of claim 18, wherein determining the attribute of the item comprises:
receiving information of the item from a third-party system associated with the item; and
determining the attribute of the item based on the information of the item.

20. The computer system of claim 18, wherein determining whether to communicate with the user based on the attribute of the item comprises inputting the attribute of the item and an attribute of the user into a trained model, the trained model outputs a determination of whether to communicate with the user, and the operations further comprise:
receiving, by the system associated with the vehicle from the client device, a response of the user to the message; and
further training the trained model based on the response of the user.

* * * * *